(12) United States Patent
Cozzi

(10) Patent No.: US 7,970,729 B2
(45) Date of Patent: Jun. 28, 2011

(54) ENTERPRISE ARCHITECTURE ANALYSIS FRAMEWORK DATABASE

(75) Inventor: Matthew Cozzi, York, PA (US)

(73) Assignee: SAP Aktiengesellschaft, Walldorf (DE)

( * ) Notice: Subject to any disclaimer, the term of this patent is extended or adjusted under 35 U.S.C. 154(b) by 774 days.

(21) Appl. No.: 10/991,967

(22) Filed: Nov. 18, 2004

(65) Prior Publication Data

US 2006/0106825 A1    May 18, 2006

(51) Int. Cl.
G06F 9/44 (2006.01)
G06F 7/00 (2006.01)
G06F 17/30 (2006.01)
G06F 17/50 (2006.01)

(52) U.S. Cl. ........ 707/601; 717/104; 717/105; 707/803; 705/7

(58) Field of Classification Search .................. None
See application file for complete search history.

(56) References Cited

U.S. PATENT DOCUMENTS

| | | | |
|---|---|---|---|
| 6,442,557 B1* | 8/2002 | Buteau et al. ................. | 707/102 |
| 7,162,427 B1* | 1/2007 | Myrick et al. ..................... | 705/1 |
| 2003/0225607 A1* | 12/2003 | Kopunovic et al. ............... | 705/9 |
| 2004/0249832 A1* | 12/2004 | Goldthorpe ................... | 707/100 |
| 2008/0015871 A1* | 1/2008 | Eder ................................. | 705/1 |
| 2008/0027841 A1* | 1/2008 | Eder ................................ | 705/35 |

OTHER PUBLICATIONS

Thomas II et al., "A Practical Guide to Federal Enterprise Architecture", Feb. 2001, Chief Information Officer Council, Version 1.0, pp. 1-60, Appendix A (A1-A2), Appendix B (B1-B4), Appendix C (C1-C2), Appendix D (D1-D19), Appendix E (E1-E3), Appendix F (F1-F4), and Appendix G (G1-G2).*

Neiger et al., "Decision Enabling Potential of a Business Process", 7th Pacific Asia Conference on Information, Jul. 10-13, 2003, Adelaide, South Australia, pp. 1089-1102; Monash University, Victoria, Australia.*

'Enterprise Architect: UML Design Tools' [online]. Sparx Systems, [retrieved on Apr. 15, 2009]. Retrieved from the Internet: <URL: http://www.sparxsystems.com/downloads/pdf/datasheets/Enterprise_Architect.pdf> (C) 1998-2009 Sparx Systems Pty Ltd.

'Gartner, Inc.' [online]. Gartner, Inc., 2006, [retrieved on Apr. 15, 2009]. Retrieved from the Internet: <URL: http://www.gartner.com/it/about_gartner.jsp>.

'ithink: Systems thinking for business' [online]. Iseesystems, [retrieved on Apr. 15, 2009]. Retrieved from the Internet: <URL: http://www.iseesystems.com/Softwares/Business/ithinkSoftware.aspx> (c) 1985-2009.

'Planview' [online]. Planview, 2006, [retrieved on May 18, 2006]. Retrieved from the Internet: <URL: http://www.planview.com/products/enterprise/> (c) 2009.

'Troux Technologies' [online]. Troux Technologies, 2006, [retrieved on May 18, 2006]. Retrieved from the Internet: <URL:www.troux.com/>.

(Continued)

Primary Examiner — Michael J Yigdall
Assistant Examiner — Ben C Wang
(74) Attorney, Agent, or Firm — Fish & Richardson P.C.

(57) ABSTRACT

A method of modeling an enterprise includes storing core objects, where the core objects include an information object defining information used in the enterprise, a participant object defining a participant in the enterprise, an enabler object defining a tool used in the enterprise, and an activity object defining a process performed in the enterprise, and storing relationship objects that define interactions between two or more of the core objects.

14 Claims, 9 Drawing Sheets

OTHER PUBLICATIONS

Buchanan et al., "Aligning Enterprise Architecture and It Investments With Corporate Goals", Object Management Group (OMG) / META Group (Aug. 2002).
BVIT: Frameworks and Methodologies That Work—Gartner, Inc.; Audrey Apfel, Mar. 2003.
C4ISR Architecture Framework Version 2.0—Architecture Working Group Framework Panel, Dec. 1997.
CIO Council, "Treasury Enterprise Architecture Framework Version 1", Department of the Treasurer (Jul. 2000).
Drobik, A., "Enterprise Architecture: The Business Issues and Drivers", Gartner Research (Aug. 2002).
Federal Enterprise Architecture Framework, Version 1.1—Chief Information Officers Council, Sep. 1999.
Grigg, J., "Harnessing Risk for Business Benefit", Gartner Group (May 2002).
Harmon, P., "Developing an Enterprise Architecture", Business Process Trends White Paper (Jan. 2003).
Jones, D., "From Chaos to Control: The CIO's Executive Guide to Managing and Securing the Enterprise", NetIQ, Chs. 1 & 2 (2003).
Kearns, J., "Building an Enterprise Architecture—The Popkin Process Version 1.0", Popkin Software (Jan. 2000).
Lopez, J., "Strategy of Acceleration: Time to Change Culture and Architecture", Gartner G2 (Jul. 2002).
Mack et al., "Six Building Blocks for Creating Real IT Strategies", Gartner Strategic Analysis Report (Dec. 2002).
Open Group, The, "The Open Group Architecture Framework (TOGAF), Version 8, Enterprise Edition", (2003).
Wang et al., "Aligning IT with Business Benefits—IDC", SAP Business Case Builder (May 2002).
Zachman Framework, [online]. 'Zachman Framework: Explore the enterprise architecture toolkit', [retrieved on May 18, 2006]. Retrieved from the Internet: <URL:http://www.enterprisearchitecturesurvival.com/zachmanframework.html> (c) 1987-2005 Zachman Int'l.
Dowding, H., "Dowding's Model for Managing Organisations", Mgmt. Books 2000 Ltd., (c) 2003.
Harmon, P., "Popkin Software System Architect" [online]. Business Process Trends, [retrieved on May 18, 2006]. Retrieved from the Internet: <URL: http://www.bptrends.com/publicationfiles/12-03%20RP%20Popkin%20SA%209-1%20Review2.pdf> (Dec. 2003).
Bittler, R., "Delivering Architecture Value Through the Project Portfolio", META Group (Mar. 2003).
Burlton et al., "An Examination of col. 2 from a Process Diehard", Process Renewal Group (Mar. 2003).
Cozzi, M., "Defining pattern variation in information object using fractal analysis", SAP AG (Jan. 2003).
Cozzi, M., "Enterprise Architecture Analysis Framework", SAP AG (Apr. 2003).
Destrooper, J. et al., "VMO010-One Day in the life of the Portfolio", SAP AG (Dec. 2002).
Dowding, H., "Additional Quotations", [online] retrieved from the Internet: http://www.howarddowding.com/quotes.htm [retrieved on Apr. 3, 2009] ( (c) 2003).
Dowding, H., "Dowding's Model for Managing Organisations", Mgmt. Books 2000 Ltd., ( (c) 2003).
Dowding, H., "Example 6: Creating your own on-line Model", [online] retrieved from the Internet: http://www.howarddowding.com/example6.htm [retrieved on Apr. 3, 2009] ( (c) 2003).
Dowding, H., "Overview", [online] retrieved from the Internet: http://www.howarddowding.com/overview.htm [retrieved on Apr. 3, 2009] ( (c) 2003).
Dowding, H., "The Universal Business Model", [online] retrieved from the Internet: http://www.howarddowding.com/modelx.htm [retrieved on Apr. 3, 2009] ( (c) 2003).
Dowding, H., "Use 1: Understanding an organization", [online] retrieved from the Internet: http://www.howarddowding.com/understanding.htm [retrieved on Apr. 3, 2009] ( (c) 2003).
Dowding, H., "Use 2: As a prompt in meetings", [online] retrieved from the Internet: http://www.howarddowding.com/prompt.htm [retrieved on Apr. 3, 2009] ( (c) 2003).
Dowding, H., "Use 3: Evaluating the effect of change", [online] retrieved from the Internet: http://www.howarddowding.com/change.htm [retrieved on Apr. 3, 2009] ( (c) 2003).
Dowding, H., "Use 4: To give a focused perspective", [online] retrieved from the Internet: http://www.howarddowding.com/perpective.htm [retrieved on Apr. 3, 2009] ( (c) 2003).
Dowding, H., "Use 5: Evaluating management grip", [online] retrieved from the Internet: http://www.howarddowding.com/managegrip.htm [retrieved on Apr. 3, 2009] ( (c) 2003).
Dowding, H., "Use 6: Comparing Organizations", [online] retrieved from the Internet: http://www.howarddowding.com/comparing.htm [retrieved on Apr. 3, 2009] ( (c) 2003).
Dowding, H., "Use 7: Understanding a generic sector", [online] retrieved from the Internet: http://www.howarddowding.com/generic.htm [retrieved on Apr. 3, 2009] ( (c) 2003).
Hay, D., "The Zachman Framework", [online] Retrieved from the Internet: <URL: http://www.essentialstrategies.com/publications/methodology/zachman.htm>, [retrieved on Apr. 3, 2009] ( (c) 2000).
Henningsen, C., "Enterprise Architecture Desk Reference-Executive Summary", META Group (Nov. 2002).
ICMG IT Achitecture Firm, "Enterprise Architecture - About Framework", [online] Retrieved from the Internet: <URL: http://www.icmgworld.com/corp/events/zachman/sa_workshop/about_framework.asp> [retrieved on Apr. 3, 2009] ( (c) 2006).
Laverdure et al., "Agile Architectures: Avoiding the Candlesticks", Hewlett Packard Compaq (Mar. 2003).
META Group, 'How Can I Cost-Effectively Plan and Integrate My IT Portfolio?—Value Management', (Nov. 2002).
Meta Group, 'IT Portfolio Management: Sustaining Proactive Business Alignment, A View From the Corner Office' (Dec. 2001).
Ravi et al., "Successfully Deploying Enterprise Solutions—KPMG Consulting's Innovative Approach", IDC, Inc. (Aug. 2002).
Vandeweghe et al., Global VMO Team "A VMO approach to Portfolio Management", SAP AG ( (c) 2002).
Wikipedia, "Zachman Framework" [online] Retrieved from the Internet: <URL: http://en.wikipedia.org/wiki/Zachman_framework> [retrieved on Apr. 3, 2009] ( (c) 2009).
Zachman, J., "The Zachman Framework: The Official Concise Definition", [online] Retrieved from the Internet: <URL: http://www.zachmaninternational.com/index.php/the-zachman-framework> ( (c) 2002).
Zachman, J., "Enterprise Architecture—A Framework" ZIFA (Zachman Institute for Framework Advancement) ( (c) 2002).
Schulman, J., "Geek Architecture: An Interview with Gartner analyst Jeff Schulman", The Gartner Group ( (c) 2002).
Schulman, J. and Comport, J., "Enterprise Architecture Special Report: Overview", The Gartner Group ( (c) 2002).
Web Page "Gartner—The new Enterprise Architecture", [online] Retrieved on Feb. 3, 2011, from: <URL:http://www.gartner.com/pages/story.php.id.2226.s.8.jsp>.

* cited by examiner

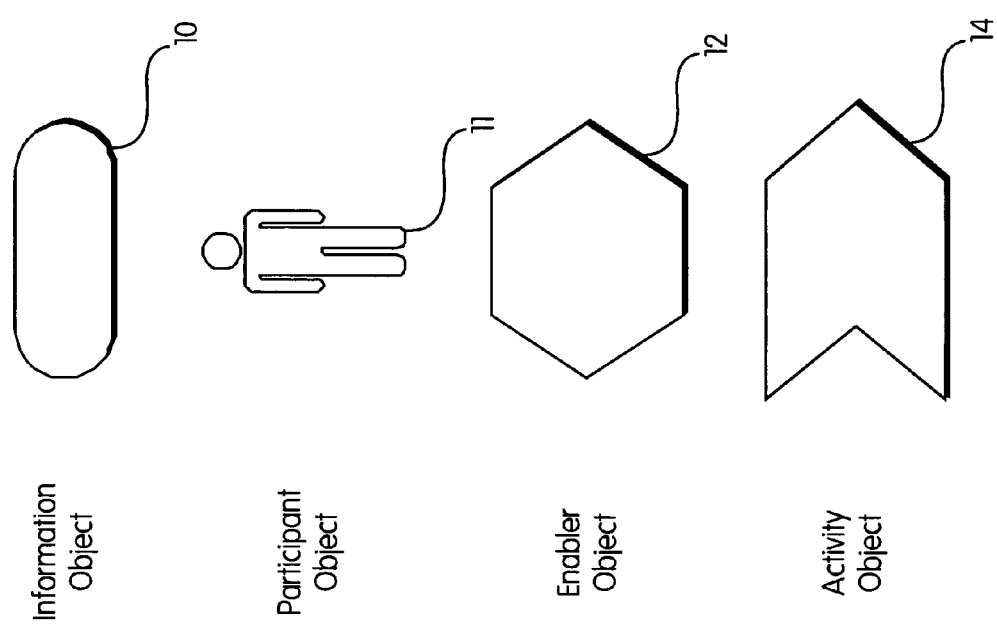

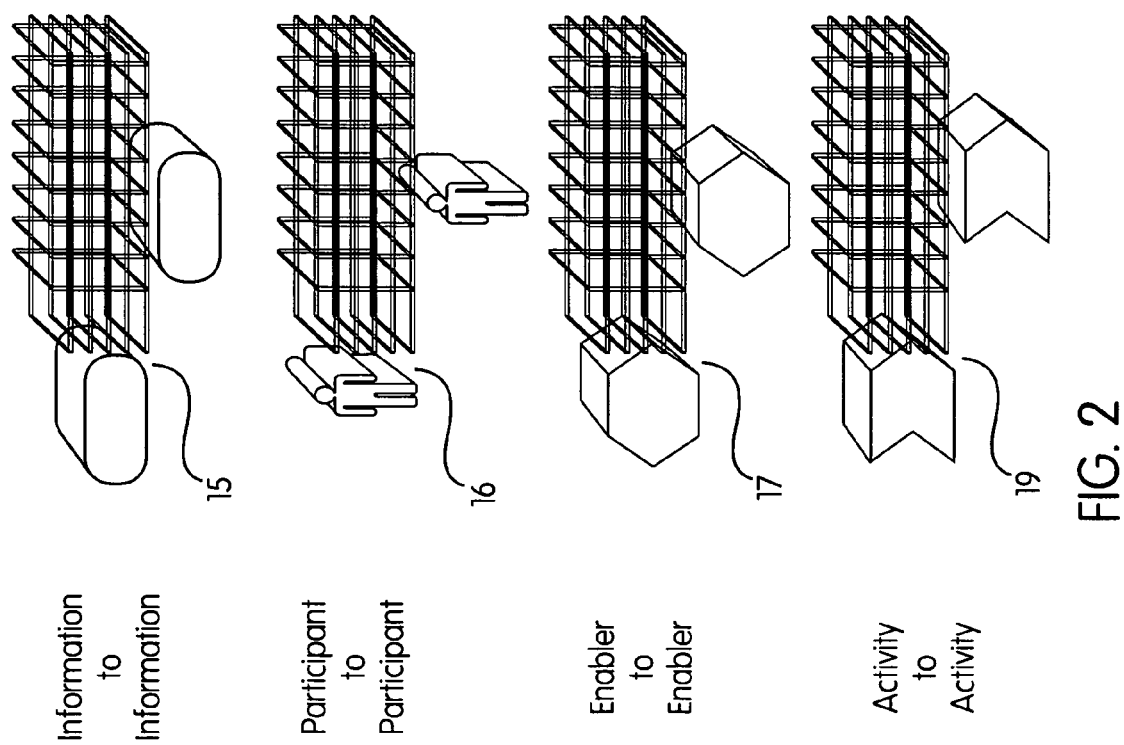

ENTERPRISE ARCHITECTURE ANALYSIS FRAMEWORK DATABASE

TECHNICAL FIELD

This patent application relates generally to modeling an enterprise and, more particularly, to modeling the enterprise by defining elements in the enterprise, and interactions between those elements, as objects in a database.

BACKGROUND

The term "architecture" has been used to refer to various types of overviews that provide guidance to software systems and applications developers. Since the mid-1990s, the term "architecture" has been used by business managers, especially those involved in enterprise planning and in business process re-engineering projects, to describe an overview of a business. For example, some managers refer to a high-level description of all core business processes in an organization as a "business process architecture".

Today, there is a growing movement among both business managers and information technology ("IT") managers to use the term "enterprise architecture" to refer to a comprehensive description of all key elements and relationships that make up an organization. Increasingly, when professionals talk about the alignment of business processes and goals with IT applications and middleware systems, they rely on an enterprise architecture to define how this business/IT alignment should be achieved.

SUMMARY

In general, in one aspect, the invention is directed to a method of modeling an enterprise. The method includes storing core objects, where the core objects comprise an information object defining information used in the enterprise, a participant object defining a participant in the enterprise, an enabler object defining a tool used in the enterprise, and an activity object defining a process performed in the enterprise, and storing relationship objects that define interactions between two or more of the core objects. This aspect may also include one or more of the following features.

The method may include storing a cell comprising at least some of the core objects and the relationship objects, where the cell comprises a set of objects needed to complete a specific objective and/or derive the information; storing a process scenario object that links the cell with other cells, where the process scenario object defines how the information is transformed over time; and/or defining influences and settings that have a bearing on the process scenario. The process scenario object may be built in accordance with the influences and settings, and may include data defining a domain to which the process scenario object belongs. The domain may be a decision-making layer within the enterprise.

A single information object may be common to the process scenario object and a second process scenario object. The activity object and the information object may correspond to associated values. The method may determine a value of the process scenario based the associated values. The relationship objects may define one of common object relationships and cross-object relationships.

In general, in another aspect, the invention is directed to a method of modeling an enterprise, which includes building core objects that define elements of an enterprise, building relationship objects that define interactions between two or more of the core objects, building a cell comprising at least some of the core objects and the relationship objects, and relating the cell to other cells. This aspect may also include the following.

The core objects may comprise an information object defining information used in the enterprise, a participant object defining a participant in the enterprise, an enabler object defining a tool used in the enterprise, and an activity object defining a process performed in the enterprise. The cell and the other cells may define a process scenario, and the method may further comprise determining a value of the process scenario based on a value of the activity object and a value of the information object. The value of the process scenario may comprise a ratio of the value of the activity object to the value of the information object.

Other features and advantages described herein will be apparent from the description, the drawings, and the claims.

DESCRIPTION OF THE DRAWINGS

FIG. 1 is a diagram that depicts core objects conceptually.

FIG. 2 is a diagram that depicts common object relationships conceptually.

Like reference numerals in different figures indicate like elements.

DETAILED DESCRIPTION

Figure 3A:
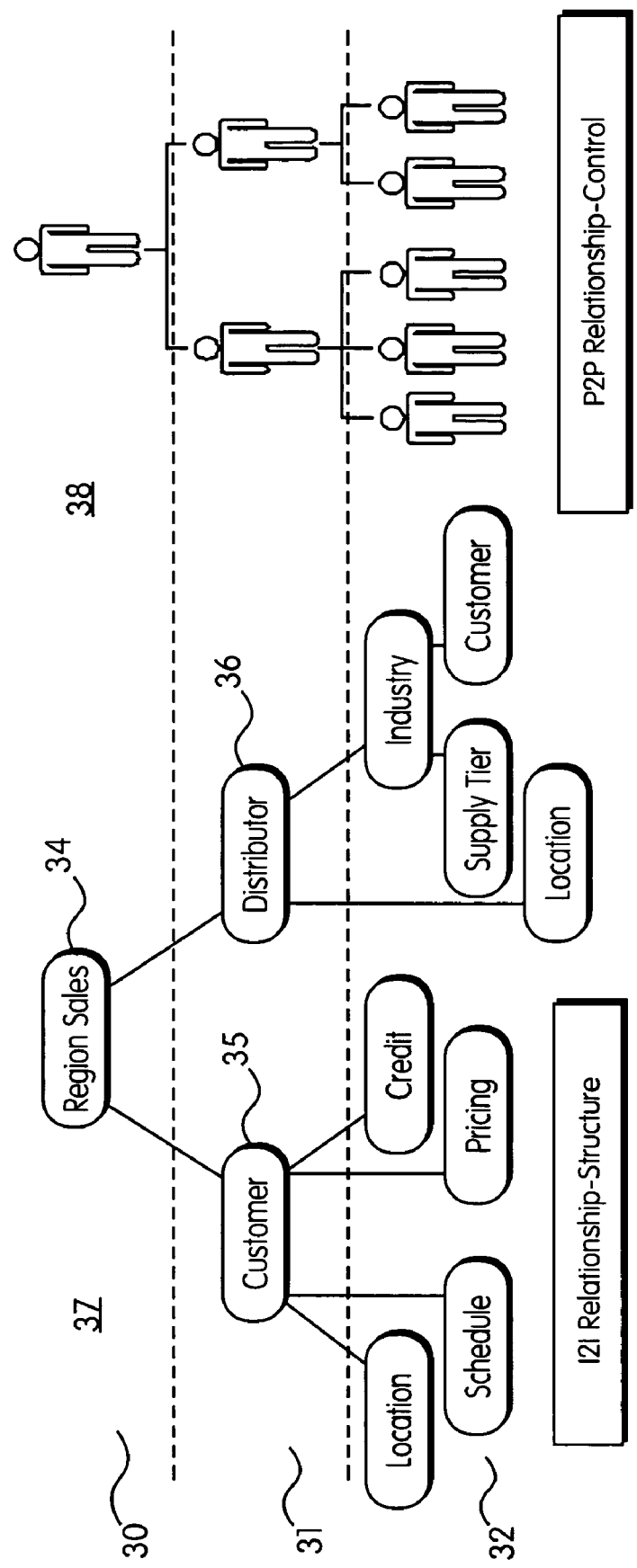
FIG. 3a is a diagram that depicts common object relationships across decision control domains.

The Enterprise Architecture Analysis Framework ("EAAF") database defines logical linkages between enterprise business, information, solutions, and technical architectures. The EAAF database includes a collection of object-oriented relational tables, which can be used to develop and analyze an enterprise architecture's current, target and migration landscapes for consistency, capability and coverage; capture, define and harmonize the enterprise's IT infrastructure components and attributes; synchronize business goals, strategies, objectives, and performance criteria with IT capabilities and resources; and harmonize timeframes required by business operations with IT program initiatives schedules. The EAAF database takes an information-centric approach, rather than a process-centric approach, as described below Core objects of the EAAF database include objects that define information (I), participants (P), activities (A) and enablers (E) of an enterprise. The core objects are described in detail below. Tables for the core objects constitute the fundamental building blocks of the EAAF database, and can be considered the "DNA" of the enterprise.

Relationships can be defined for the core objects. Relationship objects define how two or more core objects relate. There are two types of relationship objects: common object relationships and cross-object relationships. Common object relationships define relationships between identical or common core objects within the EAAF database, and include information to information (I2I), participant to participant (P2P), enabler to enabler (E2E), and activity to activity (A2A). Cross-object relationships define relationships between different core objects within the EAAF database, and include participant to information (P2I), participant to enabler (P2E), participant to activity (P2A), enabler to information (E2I), enabler to activity (E2A), and activity to information (A2I).

Core objects and relationship objects may be combined to model relationships and/or processes that occur in an enterprise. In this regard, a cell is an object that defines a set of interdependent relationships that describe an overall set of elements needed to complete a specific objective. A cell includes core objects and relationship objects that define relationships, in the cell, between the core objects. A process scenario is an object that defines relationships that cells have to one another in an overall process.

The EAAF database also contains value objects. Value objects specify objectives, benefits, metrics, influences, settings, domains and dimensions within the EAAF database. The value objects are related to cells in a process scenario, and can be used to define how different process scenarios generate value to the enterprise. The value objects also aid in constructing process scenarios by defining environmental settings that specify a landscape in which the process scenario is constructed and influences that impact the process scenario.

By assembling core objects, relationship objects, cells and process scenarios, the EAAF database is able to model an enterprise. The resulting objects can represent a single layer of the EAAF database, which encompass a domain of authority a participant controls (referred to herein as a "decision control domain") and the span of information a participant uses to make a decision or to act. Several such domains may be "stacked", e.g., interrelated, to model different aspects of the enterprise. Stacking provides an integrated view of the enterprise's participants, information, and processes for dynamic modeling.

Core Objects

In this embodiment, four core objects are stored in the EAAF database. These core objects are depicted conceptually in FIG. 1. As noted, these core objects include information (I) object 10, participant (P) object 11, enabler (E) object 12, and activity (A) object 14. Other embodiments may employ different types and/or numbers of core objects. The EAAF database defines a table for each of instance of a core object. Each such table contains user-customizable input and selection fields. These fields define, among other things, the subject matter and capabilities of each core object.

Information Object: What it is

The information object specifies information that describes an enterprise deliverable. An enterprise deliverable may be a physical object, such as a product or material, or an intangible object, such as a contract or an agreement. Data for the information object, or any other object described herein, may be input using a tool, e.g., software, a form, film, a disk, etc., and may be compiled from data coming from one or more sources, such as history, gauges, reports, visual inspection, thought, etc.

Any type of data may be included in an information object. For example, the information object may contain data that describes a category of the information (e.g., global, regional, local, functional, process), a type of the information (e.g., static, dynamic, analytic, unstructured), a state of the information (e.g., if it is still "good" data), a time value associated with the information (e.g., when the data was acquired), an update time frame for the information (e.g., how often the data's state changes), a quantity or volume of information, and a medium that stores the information (e.g., physical, electronic, optical).

Table 1 shows an exemplary definition of an information object. Other embodiments may employ different types of tables with different fields.

In Table 1, the field names identify variables that are included in the information object. The field types corresponds to groupings of fields that relate to the same concept. For example, "ID", "Name", and "Description" all serve to define the information object. "Req." indicates whether the corresponding variable is mandatory (M) or optional (O). "Use" specifies how the corresponding variable is used in the information object. "Object Check" corresponds to the type of relationship object in which the variable may be employed. The type corresponds to the data type of the variable, e.g., Boolean, character, numeric, etc. "Ref." indicates whether the corresponding variable can assume one or more different values. The reference table values constitute values that the variable can assume.

It is noted that the column definitions set forth above also apply to the remaining tables described herein.

TABLE 1

| Field Name | Field Type | Req. | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes the object with greater detail | Used to provide a secondary means of identify and searching | | Character, Field entry, Length = 255 | N | |
| Category | Classification | M | The classification value that defines the object's nature | Used to determine the change aspect of the object | | Radio button | Y | Static or dynamic |

TABLE 1-continued

| Field Name | Field Type | Req. | Description | Use | Object Check | Type | Ref. | Reference Table Values |
|---|---|---|---|---|---|---|---|---|
| Type | | M | The classification value that describes the object's reason for existence | Used to determine the business requirement for the information object | A2I | Character, Selection, Length = 10 | Y | Statutory, Regulatory, Trade, Business, Public, etc. |
| Function | | M | The classification value that describes the object's purpose and function | Used to represent process scenarios for the different flows of information based on their state and time sequence parameters | A2I | Character, Selection, Length = 12 | Y | Financial, Qualitative, Quantitative, Spatial, Measurement, Descriptive, etc. |
| State change interval (Update time frame) | Control | M | The control value that describes when the information object's state will be changed | Used to define the periodicity of state changes i.e., how often it changes, over time with respect to the interval time scale | A2I; I2I; E2I | Character, Selection, Length = 12 | Y | Periodic, Constant, Irregular, Sporadic, Cyclical, Singular, Intermittent, etc. |
| State change interval scale (Update time scale) | | M | The control value that describes the time scale of when the state change will occur | Used to define the scale to the update time frame and the periodicity of the update | A2I; I2I; E2I | Character, Selection, Length = 8 | Y | Seconds, Minutes, Hours, Days, Week, etc. |
| State change control | | M | The control value that describes the mechanism that controls the information object's state change | Used to define the change mechanism for the information state and how it is controlled | A2I; E2I | Character, Selection, Length = 12 | Y | Event triggered, Participant triggered, Time triggered, activity triggered, etc |
| Persistence | Usage | M | The usage value that describes how long the information object is required to exist or is of value | Used to determine the storage time required for an information object | E2I | Numeric, Field entry, Length = 5 | N | |
| Persistence scale | | O | The usage value that defines the scale of how long the information object is used | Used in combination with the persistence field to determine the storage time | E2I | Character, Selection, Length = 8 | Y | Seconds, minutes, hours, days, weeks, month, years, etc. |
| Volume | | O | The usage value that describes quantitatively the use of the object | Used to determined the volume of use using a quantitative measurement | E2I | Numeric, length = 5 | N | |
| Volume scale | | O | The usage value that defines the scale of the volume | Used in combination with the volume field | E2I | Character, Selection, Length = 8 | Y | Each, pounds, kilograms, pages, bytes, hours, etc. |
| Storage type | Handling | O | The handling value that classifies the object's storage requirement | Used to determine the type of storage required for the information object | E2I | Character, Selection, Length = 10 | Y | Document, electronic, photographic, imaging, etc |
| Storage medium | | O | The handling value that describes the storage medium that the information object will utilize | Used to determined the storage format required for the information object for validating the E2I relationship | E2I | Character, Selection, Length = 10 | Y | Paper, audio tape, video tape, microfiche, velum, magnetic tape, magnetic disk, optic disk, etc. |

TABLE 1-continued

| Field Name | Field Type | Req. | Description | Use | Object Check | Type | Ref. | Reference Table Values |
|---|---|---|---|---|---|---|---|---|
| Storage mode | | O | The handling value that describes the means by which the object is to be stored based on its nature | Used to determine the schema that is required based on the nature of the object to store it | E2I | Character, Selection, Length = 12 | Y | Structured, unstructured, compiled, graphical, other |
| Sensitive | Security | M | The security field that indicates whether the information is of a sensitive nature | Used to determine if the enabler has the proper security protocols to secure the information | E2I | Boolean | N | Yes/no |
| Legal requirement | | M | The security field that indicates whether the information must be secured by law or regulation | Used to determine if the enabler has the proper security protocols to secure the information | E2I | Boolean | N | Yes/no |
| Security protocol | | M | The security field that describes the security protocol that is required by law or regulation | Used to determine if the enabler and the activity has the proper security protocols to secure the information | E2I; A2I | Character, Selection, Length = 12 | Y | Physical, Electronic; Both-Electronic & Physical |

Participant Object: Who does it

A participant is an entity that performs an activity. The activity may, or may not, be automated with a tool, such as an application or a machine embedded with programmable logic. The participant object represents the individual (or individuals) who performs the activity. The individual can be internal to the enterprise, e.g., an employee, or external to the enterprise, e.g., a customer, a consultant, or a supplier's employee.

Any type of data may be included in the participant object. For example, the participant object may contain data that describes a category of the participant (e.g., employee, customer, partner, supplier), a type of the participant (e.g., manager, technician, engineer), a function of the participant (e.g., engineering, accounting, marketing), an organizational entity that the participant belongs to, a location or "geography" of the participant (e.g., North America, Europe, Asia), the participant's mobility (e.g., fixed, local mobility, regional mobility), hardware and/or devices that the participant uses, and languages (e.g., English, French, German, Spanish) that the participant speaks/understands.

Table 2 shows an exemplary definition of a participant object. Other embodiments may employ a different type of table with different fields.

TABLE 2

| Field Name | Field Type | Req. | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes the object with greater detail | Used to provide a secondary means of identify and searching | | Character, Field entry, Length = 255 | N | |
| Category | Classification | M | The classification field that defines a participant's nature and how they will interact | Used to determine how a participant will perform, engage and operate | P2P | Character, Selection, Length = 15 | Y | Owner, Channel, Partner, Worker, Supplier, |

TABLE 2-continued

| Field Name | Field Type | Req. | Description | Use | Object Check | Type | Ref. | Reference Table Values |
|---|---|---|---|---|---|---|---|---|
| | | | within an enterprise system | within an enterprise system | | | | Manager, Customer, Neighbor, Other |
| Function | | M | The classification field that defines a participant's function within the enterprise | Used to determine how a participant functions in a organization | P2P | Character, Selection, Length = 20 | Y | Line function, Staff function, Matrix function, Mini organization |
| Role | | M | The classification field that defines a participant's role within the enterprise | Used to determine how a participant interacts with other participants | P2P | Character, Selection, Length = 20 | Y | Specialist, Manager, Advocate, Adversary, etc |
| Legal entity | Domain | M | The domain field defines the legal entity to which a participant is assigned | Used to define the legal span of access, control, authorization, etc | P2I | Character, Selection, Length = 15 | Y | Predefined reference table values |
| Organizational entity | | O | The domain field defines the organizational entity to which a participant is assigned | Used to define the organizational span of access, control, authorization, etc | P2I | Character, Selection, Length = 15 | Y | Predefined reference table values |
| Mobility/ Dispersion | | M | The domain field that defines a participant's mobility with respect to responsibility | Used to define how a participant's responsibility is maintained | P2I | Character, Selection, Length = 15 | Y | Fixed, local, regional, global, etc. |
| Geography/ Region | Control | O | The control field that defines the geographic scope of responsibility for the participant | Used to determine the geographic span of control for a participant | P2I | Character, Selection, Length = 15 | Y | Predefined reference table values |
| Job class | | M | The control field that defines the participant's job category | Used to determine the level of control a participant will be permitted to have | | Character, Selection, Length = 20 | Y | Predefined reference table values |
| Quantity | | O | The control field that defines the total number of individual participants of this type | Used to determine the number of participants of a single class | | Numeric, Length = 5 | N | |
| Country | Environment | M | The environment field that defines a participant's location | Used to determine how culture will impact a participant | P2A | Character, Selection, Length = 20 | Y | Predefined reference table values |
| State/ Province/ Territory | | M | The environment field that defines a participant's location | Used to determine how geography will impact a participant | P2A | Character, Selection, Length = 20 | Y | Predefined reference table values |
| Facility | | M | The environment field that defines a participant's location | Used to determine a participant's information accessibility | P2A | Character, Selection, Length = 20 | Y | Predefined reference table values |
| Language | | M | The environment field that defines a participant's language and dialect | Used to determine how language will impact a participant's enabler needs | P2I | Indicator box (multiple selections permitted) | Y | Predefined reference table values |
| Education level | | M | The environment field that defines a participant's | Used to determine how a participant's | P2I | Indicator box (multiple | Y | Predefined reference table values |

TABLE 2-continued

| Field Name | Field Type | Req. | Description | Use | Object Check | Type | Ref. | Reference Table Values |
|---|---|---|---|---|---|---|---|---|
| | | | knowledge and skill level | ability to execute an activity or operate an enabler | | selections permitted) | | |
| Input device | Accessibility | O | The accessibility field that describes the input device used by a participant | Used to determine how a participant accesses enablers to execute their activities | P2E | Indicator box (multiple selections permitted) | Y | Terminal, computer, PDA, scanner, reader, phone, radio, etc |
| Connection medium | | O | The accessibility field that describes the connection medium that a participant uses to access information | Used to determine how a participant may connect to manage and access information | P2E | Indicator box (multiple selections permitted) | Y | CAT5, ADSL, DSL, T1, ISDN, wireless, WCDMA, etc. |
| Output device | | O | The accessibility field that describes the output device used by a participant in performing their activities | Used to determine how a participant will retrieve information to manage their activities | P2E | Indicator box (multiple selections permitted) | Y | Fax, printer, CRT, phone, LCD, plotter, projector, etc. |
| Security required | Security | M | The security field that indicates whether a participant has a security clearance | Used to validate the information security and activity security protocols | P2I; P2A | Boolean | N | Yes, No |

Activity Object: What is Done

An activity includes automated and/or manual tasks that generate a change in state of an object resulting in generation of information, or that generate a change in state of existing information. The activity object represents such tasks. The activity object may also represent a transformation of information via an activity. Such transformations may include, for example, transfer of information from a physical medium to electronic medium.

Any type of data may be included in the activity object. For example, the activity object may contain data that describes the category of the activity (e.g., manual, semi-automated, fully automated), the type of the activity (e.g., global, regional, local, other), the function of the activity (e.g., customer, industry, compliance, incidental), and whether and/or how the activity is controlled (e.g., regulated, un-regulated, mandated).

Table 3 shows an exemplary definition of an activity object. Other embodiments may employ a different type of table with different fields.

TABLE 3

| Field Name | Field Type | Req. | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes the object with greater detail | Used to provide a secondary means of identify and searching | | Character, Field entry, Length = 255 | N | |
| Category | Classification | M | The classification field that defines the nature of the activity with the system | Used to define the level of automation and flexibility within the activity's tasks | A21 | Character, Selection, Length = 20 | Y | Manual, semi-automated, fully automated, other, etc. |

TABLE 3-continued

| Field Name | Field Type | Req. | Description | Use | Object Check | Type | Ref. | Reference Table Values |
|---|---|---|---|---|---|---|---|---|
| Type | | M | The classification field that describes whether there is control on the activity | Used to identify the activity's controlling and information requirements | A2I | Character, Selection, Length = 20 | Y | Regulated, non-regulated, legislated, mandated, etc. |
| Function | | M | The classification field that describes the activity's purpose with respect to the output | Used to define the primary driver or reason for the activity and tasks | A2I | Character, Selection, Length = 20 | Y | Production, safety, compliance, quality, service, cost control, etc |
| Domain | | M | The classification field that describes the activity's span within the enterprise system | Used to the level of standardization of the activity within the enterprise | A2I | Character, Selection, Length = 20 | Y | Global, regional, national, state, local, other, etc. |
| Policy Exists | Control | O | The control field that identifies whether a policy exist that describe and or controls the activity | Used to assist in the impact assessment of an organization's policy and procedures for changes to activity | P2A; A2I | Boolean | N | Yes, No |
| Policy Name | | O | The control field that identifies the policy that describes and or controls the activity | Used to assist in the impact assessment of an organization's policy and procedures for changes to activity | P2A; A2I | Character, Selection, Length = 20 | Y | e.g. Worker Protection Standard HR109 |
| Documented Procedure Exists | Compliance | O | The compliance field that identifies whether a procedure is document for the activity | Used to assist in the impact assessment of an organization's policy and procedures for changes to activity | P2A; A2I | Boolean | N | Yes, No |
| Documented Procedure Type | Compliance | O | The compliance field that identifies the type of procedure that documents the activity for participants to follow | Used to assist in the impact assessment of the change to an activity on compliance to a regulation | P2A; A2I | Character, Selection, Length = 20 | Y | Worker safety, Production process, Product safety, Financial compliance, Maint. process, etc. |
| Documented Procedure | | O | The compliance field that identifies the procedure that documents the activity | Used to assist in the impact assessment of an organization's policy and procedures for changes to activity | P2A; A2I | Character, Selection, Length = 20 | Y | e.g. High Noise Level Precaution, Equipment clearance, Vendor contracting, Procurement, etc |
| Governmental Regulation Exists | | M | The compliance field that identifies whether a governmental regulation exists which controls the activity | Used to assist in the impact assessment of the change to a activity on compliance to a regulation | P2A; A2I | Boolean | N | Yes, No |
| Governmental Regulation Type | | M | The compliance field that identifies the type of governmental regulation that exists to control the activity | Used to assist in the impact assessment of the change to a activity on compliance to a regulation | P2A; A2I | Character, Selection, Length = 20 | Y | OSHA, DEP, EPA, HUD, NIH, DOT, SEC, NRC, OMB, etc. |

TABLE 3-continued

| Field Name | Field Type | Req. | Description | Use | Object Check | Type | Ref. | Reference Table Values |
|---|---|---|---|---|---|---|---|---|
| Governmental Regulation Name | | M | The compliance field that identifies the governmental regulation that exists to control the activity | Used to assist in the impact assessment of the change to a activity on compliance to a regulation | P2A; A2I | Character, Selection, Length = 20 | Y | e.g. US Product Safety Act 1977, |

Enabler Object: how it is Done

A tool is a manual task, or a set of programs installed as a whole and running on a single server, that performs a single business function. The enabler object reflects operational steps performed by the tool in the transformation of a deliverable through a series of actions. The operational steps result in information and a deliverable at a state that is usable to others (e.g., for use by another activity).

Any type of data may be included in the enabler object. For example, the enabler object may contain data that describes the purpose of the enabler (e.g., technical, operation management, financial, analysis, development, archiving, storage), a lifecycle date of the enabler (e.g., availability or out-of-maintenance), a data center location associated with the enabler, implementation information (e.g., project name, time frame, effort), and information about hardware associated with the enabler. This hardware information may include performance-per-user information (e.g., maximum processor, memory, bandwidth, and/or disk space per user), performance-per-document information (e.g., maximum processor, memory, bandwidth, and/or disk space per document), cluster server name, load balancer server name, security information, and language information (e.g., double-byte capability, multiple language capability). By way of example, an enabler can range from an embedded or programmable logic chip with machine language controlling a production machine that automates a production process to a software application that automates information flow and activities within a business or support process.

Table 4 shows an exemplary definition of an enabler object. Other embodiments may employ a different type of table with different fields.

TABLE 4

| Field Name | Field Type | Req. | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes the object with detail | Used to provide a secondary means of identify and searching | | Character, Field entry, Length = 255 | N | |
| Category | Classification | M | The classification field that describes the enabler itself, as to whether it can operate independently of a participant | Used to define the fundamental characteristic of the enabler as it performs an activity for a participant | E2A | Character, Selection, Length = 20 | Y | Manual, semi-automated, automated, other |
| Class | | O | The classification field that describes the development environment used to create and maintain the enabler | Used to define the flexibility of the enabler with respect to its ability to transform and change over time | E2A | Character, Selection, Length = 35 | Y | Customizable off-the-shelf, custom develop appl., embedded logic chip, pre-programmed, etc. |
| Type | | M | The classification field that defines the nature of activities that the enable will perform and automate within the enterprise system | Used to define the nature of the enabler within the enterprise system as it operates to automate and perform activities | E2A | Character, Selection, Length = 25 | Y | Control, storage, measurement, management, production, communication testing, research, tracking, etc. |

TABLE 4-continued

| Field Name | Field Type | Req. | Description | Use | Object Check | Type | Ref. | Reference Table Values |
|---|---|---|---|---|---|---|---|---|
| Function | | M | The classification field that describes the business purpose or functions the enabler supports | Used to identify the reason an enabler is used by a participant | E2I | Character, Selection, Length = 25 | Y | Product design, maintenance, payroll, billing, accounting, reporting, etc. |
| Environment | Domain | M | The domain field that describes the setting that defines how the enabler supports an activity or allows a participant to perform an activity | Used to define the setting that corresponds to the usage of the enabler within the enterprise system | P2E | Character, Selection, Length = 20 | Y | Field, factory, laboratory, office, classroom, home, transitory, warehouse, aquatic, etc. |
| Location | Domain | M | The domain field that defines the physical location of the enabler | Used to locate the enabler in relationship to a participant/ activity | P2E; E2A | Character, Selection, Length = 30 | Y | Predefined reference table values |
| Ownership | | M | The domain field that defines the legal ownership of the enabler | Used to identify a participant's rights with respect to the enabler | P2E | Character, Selection, Length = 30 | Y | Predefined reference table values |
| Encryption capability | Security | M | The security field that defines the ability of the enabler to secure the information | Used to determine the enabler's ability to secure information | E2I | Boolean | N | Yes, No |
| Encryption protocol | | O | The security field that defines the set of rules that the enabler uses to secure the information | Used to determined the protocol used by the enabler to secure information | E2I | Character, Selection, Length = 30 | Y | SNC, HTTPS, etc. |
| SSO capability | | O | The security field that determines the enabler's ability to support a single sign-on environment | Used to determine the enabler's ability to enable a single logon for a participant | P2E | Boolean | N | Yes, No |
| UNICODE capability | Environment | O | The environment field that defines the enabler's capability to support multiple language types | Used to determine the enabler's ability to support multiple participant language types | P2E | Boolean | N | Yes, No |
| Double byte character capability | | O | The environment field that identifies the capability of the enabler to support specific language types | Used to determine the enabler's ability to support a participant's specific language type | P2E | Boolean | N | Yes, No |
| Architecture Tier | Infrastructure architecture | M | The name of the logical tier upon which the enabler's application operates in productive mode | Used to determine how an enabler's application would be used by a participant or how another enabler would integrate | E2E; P2E | Character, Selection, Length = 20 | Y | Presentation, Application, Database, Middleware, Mainframe, Desktop, etc. |
| Server name | | M | Name of the server on which the enabler's application operates in productive mode | Used to determine which enabler is unavailable if a server shutdowns | E2E; P2E | Character, Selection, Length = 20 | Y | Predefined reference table |
| System ID | | M | Name of the application system ID on which the enabler's application | Used to identify the system name for enabler integration scenarios and | E2E; E2A | Character, Selection, Length = 5 | Y | Predefined reference table |

TABLE 4-continued

| Field Name | Field Type | Req. | Description | Use | Object Check | Type | Ref. | Reference Table Values |
|---|---|---|---|---|---|---|---|---|
| | | | operates in productive mode | that will support the activity automation | | | | |
| Clustered for High Availability | | M | The infrastructure architecture field that identifies the fail-over capability of the enabler's application infrastructure for activity support | Used to determine the cluster server with automated script restart the enabler's application in case of server crash | P2E; E2A | Boolean | N | Yes, No |
| Cluster server name | | O | Name of the cluster server in which the enabler's application operates in fail-over mode | Used to determine which server will be available to operate the enabler's application | E2E; P2E | Character, Selection, Length = 20 | Y | Predefined reference table |
| Load balanced | Infrastructure architecture | O | The infrastructure architecture field that identifies the load balance capability of the enabler's application infrastructure for activity support | Used to determine the load-balancing server with automated script shift work load for the enabler's application in case of heavy load | P2E; E2A | Boolean | N | Yes, No |
| Load balancer server name | | O | Name of the load balance server in which the enabler's application operates in fail-over mode | Used to determine which server will be available to operate the enabler's application | E2E; P2E | Character, Selection, Length = 20 | Y | Predefined reference table |
| Software name | Logical Architecture | M | Name of the application that enabler operates | Used to identify and distinguish the application | | Character, Selection, Length = 15 | Y | Predefined reference table values |
| Software name release | | M | Name of the application version that the enabler uses to operate in productive mode | Used to identify and distinguish the application release for determining enabler integration and activity automation support | E2E; E2A | Character, Selection, Length = 10 | Y | Predefined reference table values |
| Software correction/ patch level | | O | Name of the latest application correction patch level active within the enabler | Used to determine the enabler support level for assessing capability to support an activity | E2A | Character, Selection, Length = 5 | Y | Predefined reference table values |
| Programming language | | O | Name of the program language used to create the enabler's logic modules for event modeling and processing | Used to determine the capability to support enabler to enabler integration scenarios and enabler support | E2E; P2E | Character, Selection, Length = 10 | Y | Cobol, ABAP, FORTRAN, PLC, Java, C, C++, C#, MS-VB, etc. |
| OS dependency | | M | Name of the operating system the enabler will function on in productive mode | Used to determine the enablers platform required to operate, integrate with other enablers and support activity automation | E2E; E2A | Character, Selection, Length = 10 | Y | SUN, HP-UX, AIX, NT, W2000, WXP, AS400, Mainframe, IBMZ-OS, Linux, etc. |

TABLE 4-continued

| Field Name | Field Type | Req. | Description | Use | Object Check | Type | Ref. | Reference Table Values |
|---|---|---|---|---|---|---|---|---|
| OS correction/ patch level | | M | Name of the operating system patch level that the enabler operates on in productive mode | Used to determine the enabler support level required to operate, integrate with other enablers and support activity automation | E2E; E2A | Character, Selection, Length = 5 | Y | Predefined reference table values |
| DB dependency | | M | Name of the database application the enabler will function on in productive mode | Used to determine the enablers platform required to operate, integrate with other enablers and support activity automation | E2E, E2A | Character, Selection, Length = 10 | Y | Oracle, SAPDB, DB2-400, DB2-390, DB2-UDB, MS-SQL, Informix, etc. |
| DB patch level | | M | Name of the database application patch level that the enabler operates on in productive mode | Used to determine the enabler support level required to operate, integrate with other enablers and support activity automation | E2E; E2A | Character, Selection, Length = 5 | Y | Predefined reference table values |
| Development status | Lifecycle | M | Current status of the enabler's application that operates/ automates the enterprise's activities | Used to determine the status of the enabler's application for the support of the enterprise's activity | E2A | Character, Selection, Length = 30 | Y | In development, Beta version, Restricted shipment, Mass shipment, Extended Maintenance, Customer Maintenance, Retired, etc. |
| Availability date | | O | The date the enabler's application is available from the provider for installation on the enterprise hardware | Used to check functionality in a version and windows of opportunity for implementation | E2A | Date, Field entry, Length = 10 | Y | Julian Calendar; Format = YYYY/MM/DD |
| Installed date | | M | The date the enabler's application was install on the enterprise's hardware | Used to determine the first date of availability for an application within the enterprise | E2E; E2A | Date, Field entry, Length = 10 | Y | Julian Calendar; Format = YYYY/MM/DD |
| Last upgrade date | | M | The date the enabler's application was upgrade on the enterprise's hardware | Used to determine the date of the last version was installed for an application | E2E; E2A | Date, Field entry, Length = 10 | Y | Julian Calendar; Format = YYYY/MM/DD |
| Out of maintenance date | | M | The date the application provider sets for the standard maintenance agreement to expire | Used to determine the date the application will no longer be supported | E2E; E2A | Date, Field entry, Length = 10 | Y | Julian Calendar; Format = YYYY/MM/DD |
| Max Participants per 1 CPU | Performance | O | This field defines the CPU's maximum number of participants the enabler's application supports | Used to determine the SLA with participant requirements for sizing the enabler's hardware | P2E | Numeric, Field entry, Length = 5 | N | Format = 99999 |

TABLE 4-continued

| Field Name | Field Type | Req. | Description | Use | Object Check | Type | Ref. | Reference Table Values |
|---|---|---|---|---|---|---|---|---|
| Max users per 1 GB of memory | | O | This field defines the memory setting's maximum number of participants supported | Used to determine the SLA with participant for sizing the enabler's hardware | P2E | Numeric, Field entry, Length = 5 | N | Format = 99999 |
| Max users per 1 GB of disk space | | O | This field defines the disk's maximum number of participants supported | Used to determine the SLA with participant for sizing the enabler's hardware | P2E | Numeric, Field entry, Length = 5 | N | Format = 99999 |
| Max documents per 1 CPU | | O | This field defines the CPU's maximum number of documents supported | Used to determine the SLA with documents for sizing the enabler's hardware | E2I | Numeric, Field entry, Length = 5 | N | Format = 99999 |
| Max documents per 1 GB of memory | | O | This field defines the memory setting's maximum number of documents supported | Used to determine the SLA with documents for sizing the enabler's hardware | E2I | Numeric, Field entry, Length = 5 | N | Format = 99999 |
| Max documents per 1 GB of disk space | | O | This field defines the disk's maximum number of participants the enabler's application supports | Used to determine the SLA with documents for sizing the enabler's hardware | E2I | Numeric, Field entry, Length = 5 | N | Format = 99999 |

Common Object Relationships

As described above, the EAAF database defines common-object relationships. The EAAF stores common-object relationship objects to represent such relationships between the core objects. The common object relationships are represented conceptually in FIG. 2. In this embodiment, the common object relationships include information to information (I2I) object 15, participant to participant (P2P) object 16, enabler to enabler (E2E) object 17, and activity to activity (A2A) object 19. Other embodiments may employ different types and numbers of common object relationship objects.

The EAAF database has a defined table for each instance of a common object relationship object. Each such table contains user-customizable input and selection fields. These fields define the subject matter and capabilities of each object. Information to Information Object: how Information is Structured The information to information object defines relationships between information objects with data that is relevant within and/or across an EAAF domain. Any type of data may be included in the information to information object. For example, the information to information object may contain data that describes a category of the object (e.g., structure, unstructured), a type of the object (e.g., hierarchical, clustered, accumulated), a relationship of one information object to another information object (e.g., peer, subordinate, non-related), dependencies between information objects (e.g., time dependent, dependent, not dependent), and time value fields (e.g., an object's creation date and expiration date).

It is noted that, in Table 5 (and other tables), the "foreign key" refers to a parameter from another object. For example, "INFNM" corresponds to a code identifying one of the objects for which a relationship is being defined by the table.

Table 5 shows an exemplary definition of an information to information object. Other embodiments may employ a different type of table with different fields.

TABLE 5

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |

TABLE 5-continued

| Field Name | Field Type | Req | Description | Use | Object Check | Type | Ref. | Reference Table Values |
|---|---|---|---|---|---|---|---|---|
| Name | | M | A non-intelligent standard value that describes the object | Used to provide the primary means of identifying and searching | | Character, Field entry, Length = 30 | N | |
| Description | | M | An intelligent, non-standard value that describes the object with detail | Used to provide a secondary means of identify and searching | | Character, Field entry, Length = 255 | N | |
| Category | Classification | M | The field that categorizes the object relationship | Used to identify the relationship within the decision control domain structure | | Character, Selection, Length = 30 | Y | Peer-to-peer, Superior-Subordinate, etc |
| Class | | M | The field that identifies the object relationship structure | Used to categorize the relationship structure as to the relationship of the information objects | | Character, Selection, Length = 30 | Y | Hierarchical, Clustered, Accumulated, Singular, etc. |
| Type | | M | The field that identifies the type of the information object relationship | Used to define how the relationship is used by the objects for the performance of an activity | | Character, Selection, Length = 30 | Y | Structure, Integration, Collaboration, Communication, Control, etc |
| Dependency | Relationship | M | The field that describes the relationship of the information objects | Used to determine the dependency of the object relationships | | Character, Selection, Length = 30 | Y | Time-dependent, Activity-dependent, Decision-dependent, etc. |
| Info Object 1 ID | | M | The field that contains the first information object identification key | Used to link the two information objects and describe the relationship | INFID (foreign key) | Numeric, Selection, Length = 7 | Y | ID value from Information Object Table |
| Info Object 1 Name | | M | The field that contains the first information object name value | Used to link the two information objects and describe the relationship | INFNM (foreign key) | Character, Default, Length = 30 | Y | Name value from Information Table Auto-selected based on INFID |
| Info Object 2 ID | | M | The field that contains the second information object identification key | Used to link the two information objects and describe the relationship | INFID (foreign key) | Numeric, Selection, Length = 7 | Y | ID value from Information Table |
| Info Object 2 Name | Relationship | M | The field that contains the second information object name value | Used to link the two information objects and describe the relationship | INFNM (foreign key) | Character, Default, Length = 30 | Y | Name value from Information Table Auto-selected based on INFID |
| Lifecycle start date | Lifecycle | M | The field that identifies when the relationship between the two objects began | Used to check the relationship of the enabler to information | E2I | Date, Field entry, Length = 10 | Y | Julian Calendar; Format = YYYY/MM/DD |

TABLE 5-continued

| Field Name | Field Type | Req | Description | Use | Object Check | Type | Ref. | Reference Table Values |
|---|---|---|---|---|---|---|---|---|
| Lifecycle end date | | M | The field that identifies when the relationship between the two objects end | Used to check the relationship of the enabler to information | E2I | Date, Field entry, Length = 10 | Y | Julian Calendar; Format = YYYY/MM/DD |

Participant to Participant Object: how Participants Relate to Each Other

The participant to participant object describes enterprise organization in terms of participant relationships using data that is relevant within and/or across an EAAF domain. This type of object references participant objects with data that shows how the participants identified by those participant objects relate to one another.

Any type of data may be included in the participant to participant object. For example, the participant to participant object may contain data that describes a category of the object (e.g., legal, regulatory, investment, commerce, educational, employment), a type of the object (e.g., knowledge development, collaboration, service delivery, communication, production), a relationship between participants indicated in the object (e.g., network, colleague, superior, customer), controls associated with the object (e.g., inspect, regulate, manage, influence), and time value fields.

Table 6 shows an exemplary definition of a participant to participant object. Other embodiments may employ a different type of table with different fields.

TABLE 6

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes the object with detail | Used to provide a secondary means of identify and searching | | Character, Field entry, Length = 255 | N | |
| Category | Classification | M | The field that categorizes the relationship between the participants | Used to identify the relationship within the decision control domain structure | | Character, Selection, Length = 30 | Y | Legal, Regulatory, Investment, Commerce, Educational, Employment, etc |
| Type | | M | The field that identifies the specific type of relationship between the participants | Used to determine how a relationship may be impacted by changes in an enabler | P2E | Character, Selection, Length = 20 | Y | Knowledge Development, Collaboration, Service Delivery, Communication, Production, etc |
| Engagement | Relationship | M | The field that describes the relationship of the participants | Used to determine how a relationship may be impacted by activity changes | P2A | Character, Selection, Length = 30 | Y | Colleague, Superior, Supplier, Customer, Partner, Investor, Regulator, etc. |
| Control | | M | The field that identifies the how information is used in a participants' relationship | Used to determine how a relationship may be impacted by information changes | P2I | Character, Selection, Length = 20 | Y | Inspect, Regulate, Manage, Control, Influence, Monitor, Direct, Train, Sell, Purchase, etc. |

TABLE 6-continued

| Field Name | Field Type | Req | Description | Use | Object Check | Type | Ref. | Reference Table Values |
|---|---|---|---|---|---|---|---|---|
| Participant Object 1 ID | | M | The field that contains the first participant object identification key | Used to link the two participants and describe that relationship | PARID (foreign key) | Numeric, Selection, Length = 7 | Y | ID value from Participant Table |
| Participant Object 1 Name | | M | The field that contains the first participant object name value | Used to link the two participants and describe that relationship | PARNM (foreign key) | Character, Default, Length = 30 | Y | Name value from Participant Table auto-selected based on PARID |
| Participant Object 2 ID | | M | The field that contains the second participant object identification key | Used to link the two participants and describe that relationship | PARID (foreign key) | Numeric, Selection, Length = 7 | Y | ID value from Participant Table |
| Participant Object 2 Name | | M | The field that contains the second participant object name value | Used to link the two participants and describe that relationship | PARNAM (foreign key) | Character, Default, Length = 30 | Y | Name value from Participant Table auto-selected based on PARID |
| Frequency | Performance | O | The performance field that documents the number of times the participants communicate with each other | Used to check the impact from changes to communication and collaboration enablers | P2E | Numeric, Field entry, Length = 5 | N | Format = 99999 |
| Duration | | O | The performance field that documents the duration of the communication between participants | Used to check the impact from changes to communication and collaboration enablers | P2E | Numeric, Field entry, Length = 5 | N | Format = 99999 |
| Timescale | | O | The performance that field documents the timescale of the duration field | Used to check the impact from changes to communication and collaboration enablers | P2E | Character, Selection, Length = 8 | Y | Years, months, weeks, days, hours, minutes, seconds, etc |
| Lifecycle start date | Lifecycle | M | The lifecycle field that identifies when the relationship between the two objects began | Used to check the relationship of the participant to enabler | P2E | Date, Field entry, Length = 10 | Y | Julian Calendar; Format = YYYY/MM/DD |
| Lifecycle end date | | M | The lifecycle field that identifies when the relationship between the two objects end | Used to check the relationship of the participant to enabler | P2E | Date, Field entry, Length = 10 | Y | Julian Calendar; Format = YYYY/MM/DD |

Enabler to Enabler Object: how One Tool Interacts with Another Tool

The enabler to enabler object describes an enterprise in terms of interactions between tools (e.g., software applications) used in the enterprise. This object references enabler objects with data that is relevant within and/or across an EAAF domain.

Any type of data may be included in the enabler to enabler object. For example, the enabler to enabler object may contain data that describes a category of the object (e.g., fully automated, semi-automated, manual), a type of the object (e.g., synchronous, asynchronous, messaging, batch processing), a relationship of enablers defined in the object (e.g., procedure, time, event, protocol), dependencies of the enablers (e.g., real-time, batch, time-based), and time value fields such as those noted above.

Table 7 shows an exemplary definition of an enabler to enabler object. Other embodiments may employ a different type of table with different fields.

TABLE 7

| Field Name | Field Type | Req | Description | Use | Object Check | Type | Ref. | Reference Table Values |
|---|---|---|---|---|---|---|---|---|
| ID | General | M | A non-intelligent value that defines the unique "key" | Used to uniquely identify the | | Auto number | N | |

TABLE 7-continued

| Field Name | Field Type | Req | Description | Use | Object Check | Type | Ref. | Reference Table Values |
|---|---|---|---|---|---|---|---|---|
| | | | for the database record | object as a record and for relating it with other objects. | | | | |
| Name | | M | A non-intelligent standard value that describes the object. | Used to provide the primary means of identifying and searching. | | Character, Field entry, Length = 30 | N | |
| Description | | M | An intelligent, non-standard value that describes the object with detail. | Used to provide a secondary means of identify and searching. | | Character, Field entry, Length = 255 | N | |
| Category | Classification | M | The field that categorizes the relationship between the enablers | Used to identify the relationship within the decision control domain structure. | | Character, Selection, Length = 30 | Y | Fully automated, Semi-automated, Manual, etc |
| Type | | M | The field that identifies the specific type of relationship between the enablers | Used to determine how an enabler may be impacted by changes in an activity | E2A | Character, Selection, Length = 20 | Y | Synchronous messaging, asynchronous messaging, batch processing, etc |
| Call reason | Relationship | M | The field that identifies how information is used in an enabler's relationship | Used to determine how a relationship may be impacted by information changes | E2I | Character, Selection, Length = 20 | Y | Data processing, data storage, data validation, data transfers, data translation, other |
| Call protocol | | M | The field that describes the relationship of the enablers | Used to determine how a relationship may be impacted by activity changes | E2A | Character, Selection, Length = 30 | Y | real-time, process, event, time-based, etc. |
| Enabler Object 1 ID | | M | The field that contains the first enabler object identification key | Used to link the two enablers and describe the relationship | ENAID (foreign key) | Numeric, Selection, Length = 7 | Y | ID value from the Enabler Table |
| Enabler Object 1 Name | | M | The field that contains the first enabler object name value | Used to link the two enablers and describe that relationship | ENANM (foreign key) | Character, Default, Length = 30 | Y | Name value from Enabler Table auto-selected based on ENAID |
| Enabler Object 2 ID | | M | The field that contains the second enabler object identification key | Used to link the two enablers and describe that relationship | ENAID (foreign key) | Numeric, Selection, Length = 7 | Y | ID value from the Enabler Table |
| Enabler Object 2 Name | | M | The field that contains the second enabler object name value | Used to link the two enablers and describe that relationship | ENANM (foreign key) | Character, Default, Length = 30 | Y | Name value from Enabler Table auto-selected based on ENAID |
| Frequency | Performance | O | This field documents the number of times the enablers communicate with each other | Used to check the impact from changes to communication and collaboration enablers | E2A | Numeric, Field entry, Length = 5 | N | Format = 99999 |
| Duration | | O | This field documents the duration of the communication between enablers | Used to check the impact from changes to communication and collaboration enablers | E2A | Numeric, Field entry, Length = 5 | N | Format = 99999 |

TABLE 7-continued

| Field Name | Field Type | Req | Description | Use | Object Check | Type | Ref. | Reference Table Values |
|---|---|---|---|---|---|---|---|---|
| Timescale | | O | This field documents the timescale of the duration field | Used to check the impact from changes to communication and collaboration enablers | E2A | Character, Selection, Length = 8 | Y | Years, months, weeks, days, hours, minutes, seconds, etc |
| Volume | | O | This field documents the volume of data that is exchanged between the enablers (in KB/sec) | Used to determine the impact from changes to the information on the enabler | E21 | Numeric, Field entry, Length = 5 | N | Format = 99999 |
| Lifecycle start date | Lifecycle | M | The field that identifies when the relationship between the two objects began | Used to check the relationship of the enabler to activity | E2A | Date, Field entry, Length = 10 | Y | Julian Calendar; Format = YYYY/ MM/DD |
| Lifecycle end date | | M | The field that identifies when the relationship between the two objects end | Used to check the relationship of the participant to enabler | E2A | Date, Field entry, Length = 10 | Y | Julian Calendar; Format = YYYY/ MM/DD |

Activity to Activity Object: how One Activity Impacts Another Activity

The activity to activity object describes the enterprise's organization in terms of relationships between activities. Activities do not "call" each other, but rather have a reliance on each other in a process or a sequence of events. The activity to activity object references activity objects with data that is relevant within and/or across an EAAF domain.

Any type of data may be included in the activity to activity object. For example, the activity to activity object may contain data that describes relationships of activities in the object (e.g., time-independent, time dependent), identities of the activity objects, time value fields such as those noted above, and the like.

Table 8 shows an exemplary definition of an activity to activity object. Other embodiments may employ a different type of table with different fields.

TABLE 8

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes the object with detail | Used to provide a secondary means of identify and searching | | Character, Field entry, Length = 255 | N | |
| Category | Classification | M | The field that categorizes the object relationship | Used to identify the relationship within the decision control domain structure | | Character, Selection, Length = 30 | Y | Time-dependent, Time-independent, etc |
| Type | | M | The field that identifies the type of object relationship | Used to identify how the relationship is used by the objects for the performance of an activity | | Character Selection, Length = 20 | Y | Direct, Indirect, Support, Correlative, etc |

TABLE 8-continued

| Field Name | Field Type | Req | Description | Use | Object Check | Type | Ref. | Reference Table Values |
|---|---|---|---|---|---|---|---|---|
| Reliance | Relationship | M | The field that describes the relationship of the activity objects | Used to determine the dependency of the activity object relationships | | Character Selection, Length = 30 | Y | Analysis, Control, Decision-making, Process execution, etc. |
| Activity Object 1 ID | | M | The field that contains the first activity object identification key | Used to link the two activity objects and describe the relationship | ACTID (foreign key) | Numeric, Selection, Length = 7 | Y | ID value from Activity Table |
| Activity Object 1 Name | | M | The field that contains the first activity object name value | Used to link the two activity objects and describe the relationship | ACTNM (foreign key) | Character Default, Length = 30 | Y | Name value from Activity Table auto-selected based on ACTID |
| Activity Object 2 ID | | M | The field that contains the second activity object identification key | Used to link the two activity objects and describe the relationship | ACTID (foreign key) | Numeric, Selection, Length = 7 | Y | ID value from Activity Table |
| Activity Object 2 Name | | M | The field that contains the second activity object name value | Used to link the two activity objects and describe the relationship | ACTNAM (foreign key) | Character, Default, Length = 30 | Y | Name value from Activity Table auto-selected based on ACTID |
| Lifecycle start date | Lifecycle | M | The field that identifies when the relationship between the two objects began | Used to check the relationship of the enabler to activity | E2A | Date, Field entry, Length = 10 | Y | Julian Calendar; Format = YYYY/MM/DD |
| Lifecycle end date | | M | The field that identifies when the relationship between the two objects end | Used to check the relationship of the enabler to activity | E2A | Date, Field entry, Length = 10 | Y | Julian Calendar; Format = YYYY/MM/DD |

FIG. 3a shows an example of common object relationships across different decision control domains 30, 31 and 31. The I2I relationship structure 37 of FIG. 3a shows how information relates across the three domains; and the P2P relationship structure 38 of FIG. 3a shows how participants relate to one another across the domains. For example, in the I2I structure, information 34 relating to regional sales may include information 35 relating to sales to a customer and information 36 relating to sales to a distributor. In turn, information 35 and 36 may relate to information in domain 32.

Figure 3B:
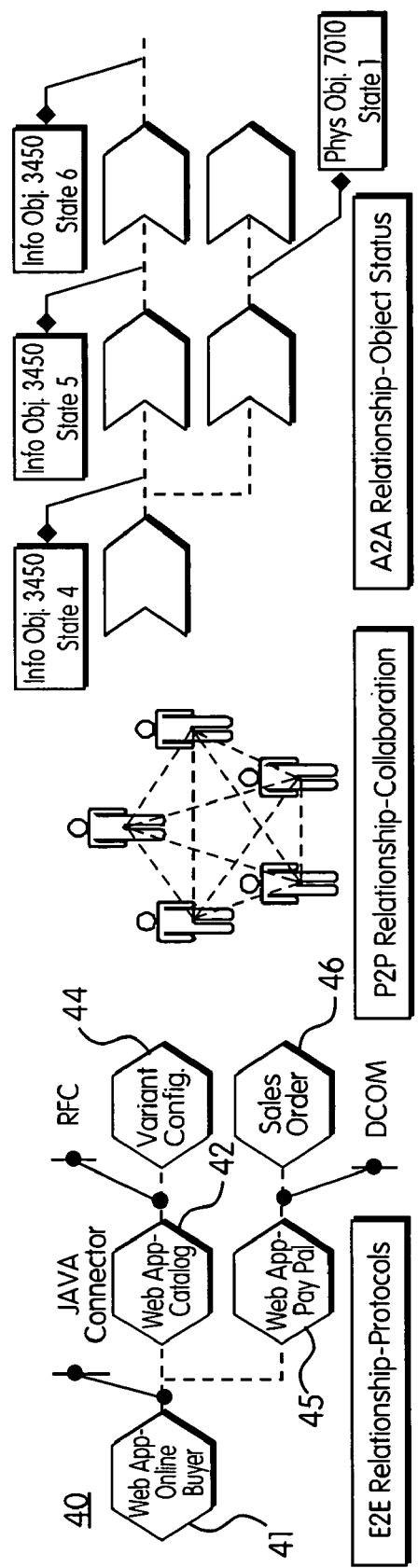
FIG. 3b is a diagram that depicts common object relationships in a single decision control domain.

FIG. 3b shows common object relationships in a single domain. For example, the E2E relationship structure 40 shows how various Web-related applications are employed in an online transaction. Web application 41 is used to purchase a product that is displayed by Web catalog 42 and configurator 42. Web application pay pal 45 is used to collect payment and other information for the purchase, and to generate a sales order 46.

Cross-Object Relationships

Cross-object relationships within the EAAF database describe "the how" and "the why" of objects relationships, i.e., the purpose of their relationship. The EAAF stores cross-object relationship objects that interrelate different types of core objects in the EAAF database. The cross-object relationship objects are defined by tables that contain data defining an object's integration and dependency on another object based on specific environmental condition(s). The cross-object relationships objects also reflect how varying influences and changing conditions impact cross-object dependencies. Cross-object relationships do not cross decision-control domains.

Figure 4:
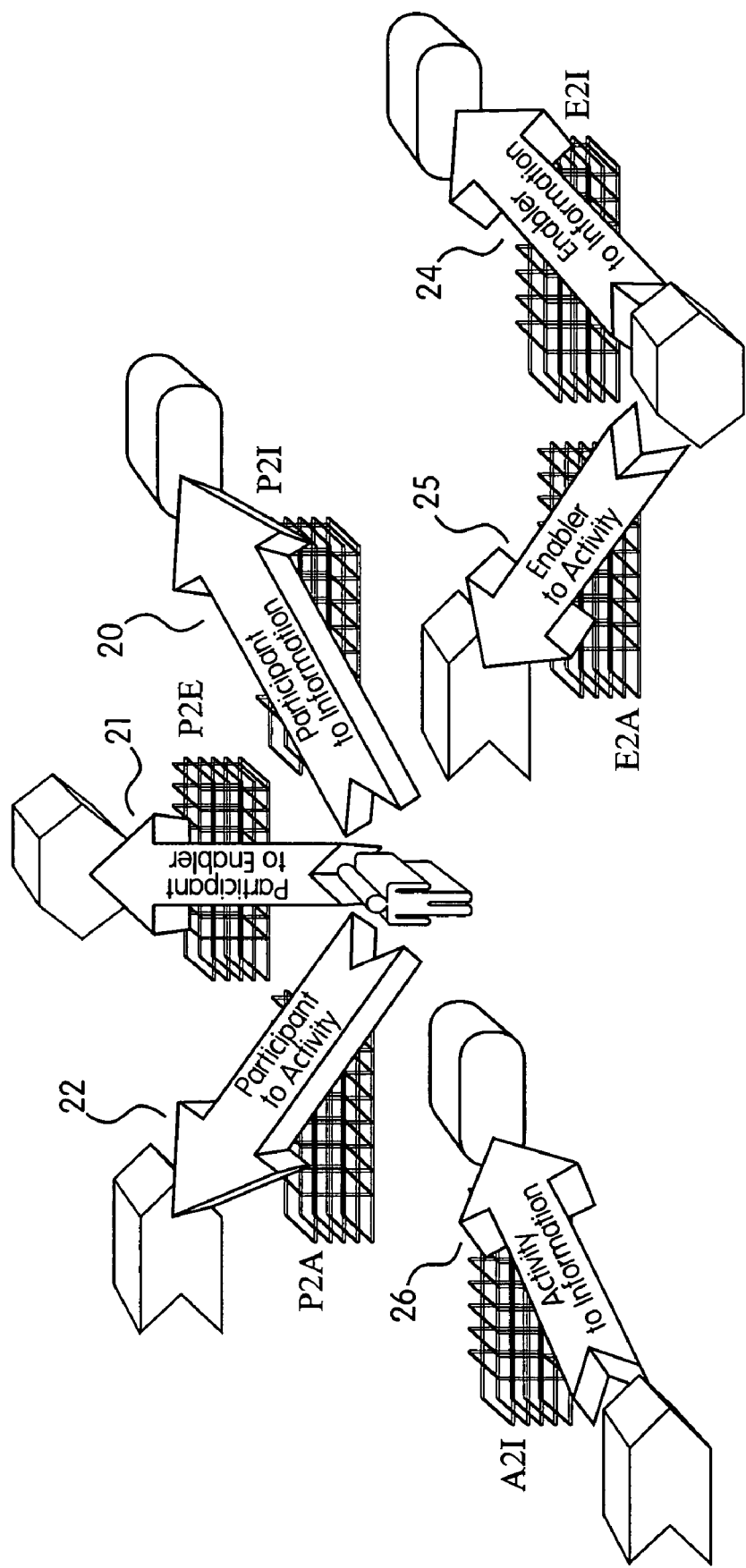
FIG. 4 is a diagram that depicts cross-object relationships conceptually.

The cross-object relationships are depicted conceptually in FIG. 4. As noted above, cross-object relationship objects include participant to information (P2I) object 20, participant to enabler (P2E) object 21, participant to activity (P2A) object 22, enabler to information (E2I) object 24, enabler to activity (E2A) object 25, and activity to information (A2I) object 26. Other embodiments may employ different types and numbers of objects.

Enabler to Activity Object: What Enables the Activity

The activity to enabler object describes which tools (enablers) perform a particular process (activity). Any type of data may be included in the enabler to activity object. For example, the enabler to activity object may contain data that describes the subject activity and enabler objects, a type of the activity referenced in the activity to enabler object (e.g., fully automated, partially automated, not automated), expected duration, and frequency.

Table 9 shows an exemplary definition of an enabler to activity object. Other embodiments may employ a different type of table with different fields.

TABLE 9

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes the object with detail | Used to provide a secondary means of identify and searching | | Character, Field entry, Length = 255 | N | |
| Category | Classification | M | The field that describes how the enabler interacts with the activity for automation | Used to determine improvements to the information transformation | A2I | Character, Selection, Length = 15 | Y | Interactive, Active, Passive, etc. |
| Type | | M | The field that describes the level of automation the enabler provides | Used to determine the improvements to the activity via automation | A2I | Character, Selection, Length = 15 | Y | Fully automated, Partially automated, Un-automated, etc. |
| Enabler Object ID | Relationship | M | The field that contains the enabler object identification key | Used to link the two objects and describe that relationship | ENAID (foreign key) | Numeric, Selection, Length = 7 | Y | ID value from the Enabler Table |
| Enabler Object Name | | M | The field that contains the enabler object name value | Used to link the two objects and describe that relationship | ENANAM (foreign key) | Character, Default, Length = 30 | Y | Name value from Enabler Table auto-selected based on ENAID |
| Activity Object ID | | M | The field that contains the activity object identification key | Used to link the two objects and describe that relationship | ACTID (foreign key) | Numeric, Selection, Length = 7 | Y | ID value from the Activity Table |
| Activity Object Name | | M | The field that contains the activity object name value | Used to link the two objects and describe that relationship | ACTNAM (foreign key) | Character, Default, Length = 30 | Y | Name value from Activity Table auto-selected based on ACTID |
| Frequency | Performance | O | The field documents the number of times the enabler is executes within an activity execution | Used to check the enabler's ability to support the participant in their activity execution | P2A | Numeric, Field entry, Length = 5 | N | Format = 99999 |
| Duration | | O | The field documents the duration the enabler executes logic to automate an activity | Used to check the enabler's ability to support the participant in their activity execution | P2A | Numeric, Field entry, Length = 5 | N | Format = 99999 |
| Timescale | | O | The performance field that documents the timescale of the duration field | Used to check the enabler's ability to support the participant in their activity execution | P2A | Character, Selection, Length = 8 | Y | Years, months, weeks, days, hours, minutes, seconds, etc |
| Lifecycle start date | Lifecycle | M | The field that identifies when the relationship between the two objects began | Used to check the relationship of the participant to activity | P2A | Date, Field entry, Length = 10 | Y | Julian Calendar; Format = YYYY/MM/DD |

TABLE 9-continued

| Field Name | Field Type | Req | Description | Use | Object Check | Type | Ref. | Reference Table Values |
|---|---|---|---|---|---|---|---|---|
| Lifecycle end date | | M | The field that identifies when the relationship between the two objects end | Used to check the relationship of the participant to activity | P2A | Date, Field entry, Length = 10 | Y | Julian Calendar; Format = YYYY/MM/DD |

Participant to Information Object: What Decision a Participant Makes Using Information The participant to information object specifies a decision that is made by a participant referenced in the object based on information referenced in the object. Any type of data may be included in the participant to information object. For example, the participant to information object identifies the subject participant and information objects, a type of the decision made by the participant (e.g., automated, manual, other), a medium (e.g., computer, TV, telephone, newspaper) on which the information is contained, and the like. The participant to information object provides data that is structured in a format that is representative of a current state of affairs or events, i.e., relevancy, and is accurate in terms of the time value or sensitivity.

Table 10 shows an exemplary definition of a participant to information object. Other embodiments may employ a different type of table with different fields.

TABLE 10

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes the object with detail | Used to provide a secondary means of identify and searching | | Character, Field entry, Length = 255 | N | |
| Category | Classification | M | The field that categorizes the participant to information relationship | It describes how a Participant relates to an information | | Character, Selection, Length = 30 | Y | Content owner, Content processor, Structure owner, etc. |
| Type | | M | The field that describes whether the relationship is automated by an enabler (tool) | Used to check on the enabler to information relationship | E2I | Character, Selection, Length = 20 | Y | Fully automated, Semi-automated, Manual, etc. |
| Decision Object | Impact | M | The field that indicates whether the participant makes a decision | Used to check the enabler's decision support capability for the participant | E2I | Boolean | N | Yes, No |
| Criticality | | O | The field that describes the value of the information to the participant in how it affects the participant | Used to check on the enabler to information relationship | E2I | Character, Selection, Length = 25 | Y | Business critical, Program critical, Project critical, Operation critical, Decision critical, Non-critical, etc. |
| Medium | Relationship | M | The field that defines the medium by which the participant interacts with the information | Used to check on the enabler to information relationship | E2I | Character, Selection, Length = 30 | Y | Computer, Report, Document, T.V., Drawing, Internet, Telephone, Radio, Print media, etc. |

TABLE 10-continued

| Field Name | Field Type | Req | Description | Use | Object Check | Type | Ref. | Reference Table Values |
|---|---|---|---|---|---|---|---|---|
| Participant Object ID | | M | The field that contains the participant object identification key | Used to link the two objects and describe the relationship | PARID (foreign key) | Numeric, Selection, Length = 7 | Y | ID value from the Participant Table |
| Participant Object Name | | M | The field that contains the participant object name value | Used to link the two objects and describe that relationship | PARNAM (foreign key) | Character, Default, Length = 30 | Y | Name value from Participant Table auto-selected based on PARID |
| Information Object ID | | M | The field that contains the information object identification key | Used to link the two objects and describe that relationship | INFID (foreign key) | Numeric, Selection, Length = 7 | Y | ID value from the Information Table |
| Information Object Name | Relationship | M | The field that contains the information object name value | Used to link the two objects and describe that relationship | INFNAM (foreign key) | Character, Default, Length = 30 | Y | Name value from Information Table auto-selected based on INFID |
| Periodicity - Yearly | Control | O | The field that defines the requirement regarding availability and control | Used to check the relationship of the information's timing with respect to the activity | P2A | Character, Selection, Length = 20 | Y | Bi-annual, Annual, Semi-annual, Quarterly, etc. |
| Periodicity - Monthly | | O | The field that defines the requirement regarding availability and control | Used to check the relationship of the information's timing with respect to the activity | P2A | Character, Selection, Length = 20 | Y | Bi-monthly, Monthly, Semi-monthly, etc |
| Periodicity - Weekly | | O | The field that defines the requirement regarding availability and control | Used to check the relationship of the information's timing with respect to the activity | P2A | Character, Selection, Length = 20 | Y | Bi-Weekly, Weekly, Semi-Weekly, etc. |
| Periodicity - Daily | | O | The field that defines the requirement regarding availability and control | Used to check the relationship of the information's timing with respect to the activity | P2A | Character, Selection, Length = 20 | Y | Once Daily, Twice Daily, Three Times Daily, etc. |
| Periodicity - Time | | O | The field that defines the requirement regarding availability and control | Used to check the relationship of the information's timing with respect to the activity | P2A | Character, Selection, Length = 20 | Y | Hourly, By the minute, By the second, etc. |
| Frequency | Performance | O | The performance field documents the number of times the participants uses the information to control an activity | Used to check the impact from changes to activity and collaboration enablers | E2I; P2A | Numeric, Field entry, Length = 5 | N | Format = 99999 |
| Duration | | O | The performance field documents the use duration of the information by the participants | Used to check the impact from changes to activity and collaboration enablers | E2I; P2A | Numeric, Field entry, Length = 5 | N | Format = 99999 |
| Timescale | | O | The performance field that documents the timescale of the duration field | Used to check the impact from changes to communication and collaboration enablers | E2I; P2A | Character, Selection, Length = 8 | Y | Years, months, weeks, days, hours, minutes, seconds, etc |

TABLE 10-continued

| Field Name | Field Type | Req | Description | Use | Object Check | Type | Ref. | Reference Table Values |
|---|---|---|---|---|---|---|---|---|
| Lifecycle start date | Lifecycle | M | The field that identifies when the relationship between the two objects began | Used to check the relationship of the enabler to Information | E2I | Date, Field entry, Length = 10 | Y | Julian Calendar; Format = YYYY/MM/DD |
| Lifecycle end date | | M | The field that identifies when the relationship between the two objects end | Used to check the relationship of the enabler to Information | E2I | Date, Field entry, Length = 10 | Y | Julian Calendar; Format = YYYY/MM/DD |

Participant to Activity Object: why the Participant is Performing the Activity

The participant to activity object describes why the participant referenced in the object is performing the activity referenced in the object. Any type of data may be included in the participant to information object. For example, the information may specify the subject participant and activity objects, a category of the activity (e.g., active, passive, other), a type of the participant (e.g., individual, team, other), a role of the participant (e.g., facilitator, supervisor, executor, etc.), performance of the participant (e.g., expected execution duration), and frequency of execution of the activity referenced in the object.

Table 11 shows an exemplary definition of a participant to activity object. Other embodiments may employ a different type of table with different fields.

TABLE 11

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes the object with detail | Used to provide a secondary means of identify and searching | | Character, Field entry, Length = 255 | N | |
| Category | Classification | M | The field that describes whether the relationship is automated by an enabler (tool) | Used to check on the enabler to activity relationship | E2A | Character, Selection, Length = 20 | Y | Fully automated, Semi-automated, Manual, etc. |
| Type | | M | The field that defines the relationship of the participant to activity | Used to check on the participant to participant relationship | P2P | Character, Selection, Length = 20 | Y | Individual, Team member, Alliance member, Work crew, etc. |
| Role | Relationship | M | This field defines the role the participant is engaged with respect to the performing the activity | Used to check on the participant to participant relationship | P2P | Character, Selection, Length = 20 | Y | Facilitator, Mentor Supervisor, Worker, Trade Partner, etc. |
| Participant Object ID | | M | The field that contains the participant object identification key | Used to link the two objects and describe the relationship | PARID (foreign key) | Numeric, Selection, Length = 7 | Y | ID value from the Participant Table |
| Participant Object Name | | M | The field that contains the participant object name value | Used to link the two objects and describe that relationship | PARNAM (foreign key) | Character, Default, Length = 30 | Y | Name value from Participant Table auto-selected based on PARID |

TABLE 11-continued

| Field Name | Field Type | Req | Description | Use | Object Check | Type | Ref. | Reference Table Values |
|---|---|---|---|---|---|---|---|---|
| Activity Object ID | | M | The field that contains the activity object identification key | Used to link the two objects and describe that relationship | ACTID (foreign key) | Numeric, Selection, Length = 7 | Y | ID value from the Activity Table |
| Activity Object Name | | M | The field that contains the activity object name value | Used to link the two objects and describe that relationship | ACTNAM (foreign key) | Character, Default, Length = 30 | Y | Name value from Activity Table auto-selected based on ACTID |
| Periodicity - Yearly | Control | O | The field that defines the requirement regarding availability and control | Used to check the relationship of the information's timing with respect to the activity | P2A | Character, Selection, Length = 20 | Y | Bi-annual, Annual, Semi-annual, Quarterly, etc. |
| Periodicity - Monthly | Control | O | The field that defines the requirement regarding availability and control | Used to check the relationship of the information's timing with respect to the activity | P2A | Character, Selection, Length = 20 | Y | Bi-monthly, Monthly, Semi-monthly, etc |
| Periodicity - Weekly | | O | The field that defines the requirement regarding availability and control | Used to check the relationship of the information's timing with respect to the activity | P2A | Character, Selection, Length = 20 | Y | Bi-Weekly, Weekly, Semi-Weekly, etc. |
| Periodicity - Daily | | O | The field that defines the requirement regarding availability and control | Used to check the relationship of the information's timing with respect to the activity | P2A | Character, Selection, Length = 20 | Y | Once Daily, Twice Daily, Three Times Daily, etc. |
| Periodicity - Time | | O | The field that defines the requirement regarding availability and control | Used to check the relationship of the information's timing with respect to the activity | P2A | Character, Selection, Length = 20 | Y | Hourly, By the minute, By the second, etc. |
| Frequency | Performance | O | The field documents the number of times the participant executes the activity | Used to check the enabler's ability to support the participant in their activity performing | E2A | Numeric, Field entry, Length = 5 | N | Format = 99999 |
| Duration | | O | The field documents the participant's duration for executing the activity including thought and break time | Used to check the enabler's ability to support the participant in their activity performing | E2A | Numeric, Field entry, Length = 5 | N | Format = 99999 |
| Timescale | | O | The performance field that documents the timescale of the duration field | Used to check the enabler's ability to support the participant in their activity performing | E2A | Character, Selection, Length = 8 | Y | Years, months, weeks, days, hours, minutes, seconds, etc |

TABLE 11-continued

| Field Name | Field Type | Req | Description | Use | Object Check | Type | Ref. | Reference Table Values |
|---|---|---|---|---|---|---|---|---|
| Lifecycle start date | Lifecycle | M | The field that identifies when the relationship between the two objects began | Used to check the relationship of the enabler to activity | E2A | Date, Field entry, Length = 10 | Y | Julian Calendar; Format = YYYY/MM/DD |
| Lifecycle end date | | M | The field that identifies when the relationship between the two objects end | Used to check the relationship of the enabler to activity | E2A | Date, Field entry, Length = 10 | Y | Julian Calendar; Format = YYYY/MM/DD |

Participant to Enabler Object: how the Participant Uses the Tool

The participant to enabler object describes how the participant referenced in the object uses the enabler (tool) referenced in the object. Any type of data may be included in the participant to enabler object. For example, the information may specify the subject participant and enabler objects, as well as the other information noted below.

Table 12 shows an exemplary definition of a participant to enabler object. Other embodiments may employ a different type of table with different fields.

TABLE 12

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes the object with detail | Used to provide a secondary means of identify and searching | | Character, Field entry, Length = 255 | N | |
| Category | Classification | M | The field that describes whether the relationship is automated by an enabler (tool) | Used to check on the enabler to activity relationship | E2A | Character, Selection, Length = 15 | Y | Active, Passive, etc. |
| Type | | M | The field that defines the relationship of the participant to enabler with respect to the activity performed while using the enabler | Used to define the purpose of the relationship between the objects for checking activity support | E2A | Character, Selection, Length = 25 | Y | Information access, Information presentation, Activity execution, Activity analysis, etc. |
| Presentation | Interface | M | The field that defines the participant to the enabler relationship with respect the exchange mechanism | Used to check the relationship and support of the enabler to the information required | E2I | Character, Selection, Length = 20 | Y | Presentation server, Desktop, Web browser, Terminal, etc. |
| Protocol | | M | The field that defines the participant to the enabler relationship with respect the exchange medium | Used to check the relationship and support between enablers to communicate | E2E | Character, Selection, Length = 20 | Y | FTP, LAN, WAN, WAP, Satellite, WWW, etc. |

TABLE 12-continued

| Field Name | Field Type | Req | Description | Use | Object Check | Type | Ref. | Reference Table Values |
|---|---|---|---|---|---|---|---|---|
| Support Level | Impact | O | The field that identifies the time value of the participant's activity | Used to check the participant's ability to execute the activity | P2A | Time, Field entry, Length = 6 | N | Format = HH:MM:SS |
| Productivity Impact | | O | The field that identifies the impact to the participant's productivity | Used to determine the impact to the participant's activity execution | P2A | Boolean | N | Yes, No |
| Participant Object ID | Relationship | M | The field that contains the participant object identification key | Used to link the two objects and describe the relationship | PARID (foreign key) | Numeric, Selection, Length = 7 | Y | ID value from the Participant Table |
| Participant Object Name | Relationship | M | The field that contains the participant object name value | Used to link the two objects and describe that relationship | PARNAM (foreign key) | Character, Default, Length = 30 | Y | Name value from Participant Table auto-selected based on PARID |
| Enabler Object ID | | M | The field that contains the enabler object identification key | Used to link the two objects and describe that relationship | ENAID (foreign key) | Numeric, Selection, Length = 7 | Y | ID value from the Enabler Table |
| Enabler Object Name | | M | The field that contains the enabler object name value | Used to link the two objects and describe that relationship | ENANAM (foreign key) | Character, Default, Length = 30 | Y | Name value from Enabler Table auto-selected based on ENAID |
| Hours per Day | Availability | O | The field that defines the requirement regarding the enabler's availability | Used to check the participant's requirement for activity execution | P2A | Time, Field entry, Length = 6 | N | Format = HH:MM:SS |
| Days per week | | O | The field that defines the requirement regarding the enabler's availability | Used to check the participant's requirement for activity execution | P2A | Numeric, Field entry, Length = 1 | N | Format = 9 |
| Days per Month | | O | The field that defines the requirement regarding the enabler's availability | Used to check the participant's requirement for activity execution | P2A | Numeric, Field entry, Length = 2 | N | Format = 99 |
| Days per Year | | O | The field that defines the requirement regarding the enabler's availability | Used to check the participant's requirement for activity execution | P2A | Numeric, Field entry, Length = 3 | N | Format = 999 |
| Frequency | Performance | O | The field documents the number of times the participant executes the logic in the enabler | Used to check the enabler's ability to support the participant in their activity execution | P2A | Numeric, Field entry, Length = 5 | N | Format = 99999 |
| Duration | | O | The field documents the participant's duration for executing the enabler's logic | Used to check the enabler's ability to support the participant in their activity execution | P2A | Numeric, Field entry, Length = 5 | N | Format = 99999 |

TABLE 12-continued

| Field Name | Field Type | Req | Description | Use | Object Check | Type | Ref. | Reference Table Values |
|---|---|---|---|---|---|---|---|---|
| Timescale | | O | The performance field that documents the timescale of the duration field | Used to check the enabler's ability to support the participant in their activity execution | P2A | Character, Selection, Length = 8 | Y | Years, months, weeks, days, hours, minutes, seconds, etc |
| Lifecycle start date | Lifecycle | M | The field that identifies when the relationship between the two objects began | Used to check the relationship of the participant to activity | P2A | Date, Field entry, Length = 10 | Y | Julian Calendar; Format = YYYY/MM/DD |
| Lifecycle end date | | M | The field that identifies when the relationship between the two objects end | Used to check the relationship of the participant to activity | P2A | Date, Field entry, Length = 10 | Y | Julian Calendar; Format = YYYY/MM/DD |

Enabler to Information Object: how the Information is Transformed by the Enabler The enabler to information object describes how information referenced in the object is transformed by a tool referenced in the object. One of the objectives of this object is to identify methods contained within the enabler object that are deployed within an enterprise and that are used to transform information from one state to another, or from one medium to another. A time variable contained within the object description table is used to determine if different enablers transform information between states at a consistent rate. This time variable indicates how effectively the enabler will be able to support increases in activities (i.e., load) that the enabler has automated.

Any type of data may be included in the enabler to information object. For example, the object may include a category of the information relative to the enabler (e.g., input or output), a type of the information (e.g., data, voice feed, algorithm, video feed), an initial state of the information (e.g., before processing), a final state of the information (e.g., after processing), performance data (e.g., duration of a call), and frequency data (e.g., exchange volume per call).

Table 13 shows an exemplary definition of an enabler to information object. Other embodiments may employ a different type of table with different fields.

TABLE 13

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes the object with detail | Used to provide a secondary means of identify and searching | | Character, Field entry, Length = 255 | N | |
| Category | Classification | | The field that identifies the relationship to the physical activity | Used to check the requirement for enabling the information transformation for an acitvity | A2I: I2I | Character, Selection, Length = 8 | Y | Input, Output, etc. |

TABLE 13-continued

| Field Name | Field Type | Req | Description | Use | Object Check | Type | Ref. | Reference Table Values |
|---|---|---|---|---|---|---|---|---|
| Type | | M | The field that identifies the enabler's technology that will be used to manage the information object | Used to validate the technology to enable automation of the activity and its transformation of the information object | A2I; I2I | Character, Selection, Length = 10 | Y | Audio, Video, Digital Graphics, Drawing, Electronic Document, Physical Document, etc. |
| Before processing | State | M | The field that identifies the initial state of the information object prior to its transformation via the activity | Used to check the information relevancy and the participant's requirement for controlling the event process | A2I; P2I; I2I | Numeric, Field entry, Length = 3 | N | Format = 999 e.g. 000, 001, 002, 003 000 means that this info does not yet exist and the enabler supports a creation process. |
| After Processing | | M | The field that identifies the initial state of the information object after its transformation via the activity | Used to check the information relevancy and the participant's requirement for controlling the event process | A2I; P2I; I2I | Numeric, Field entry, Length = 3 | N | Format = 999 e.g. "state before processing" + 1, so: 001, 002, 003, 004 . . . n + 1 |
| Enabler Object ID | Relationship | M | The field that contains the enabler object identification key | Used to link the two objects and describe that relationship | ENAID (foreign key) | Numeric, Selection, Length = 7 | Y | ID value from the Enabler Table |
| Enabler Object Name | | M | The field that contains the enabler object name value | Used to link the two objects and describe that relationship | ENANAM (foreign key) | Character, Default, Length = 30 | Y | Name value from Enabler Table auto-selected based on ENAID |
| Information Object ID | | M | The field that contains the information object identification key | Used to link the two objects and describe that relationship | INFID (foreign key) | Numeric, Selection, Length = 7 | Y | ID value from the Information Table |
| Information Object Name | | M | The field that contains the information object name value | Used to link the two objects and describe that relationship | INFNAM (foreign key) | Character, Default, Length = 30 | Y | Name value from Information Table auto-selected based on INFID |
| Frequency | Performance | O | This field documents the number of times the enabler executes its logic to manage the information object | Used to check the performance of the enabler required to manage the information object transformation | A2I; I2I | Numeric, Field entry, Length = 5 | N | Format = 99999 |
| Duration | | O | This field documents the duration of the enabler's logic to manage the information object | Used to check the performance of the enabler required to manage the information object transformation | A2I; I2I | Numeric, Field entry, Length = 5 | N | Format = 99999 |

TABLE 13-continued

| Field Name | Field Type | Req | Description | Use | Object Check | Type | Ref. | Reference Table Values |
|---|---|---|---|---|---|---|---|---|
| Timescale | | O | This field documents the timescale of the duration field | Used to check the performance of the enabler required to manage the information object transformation | A2I; I2I | Character, Selection, Length = 8 | Y | Years, months, weeks, days, hours, minutes, seconds, etc |
| Volume | | O | This field documents the volume of information that is managed by the enabler for the activity execution | Used to check the performance of the enabler required to manage the information object transformation | A2I; I2I | Numeric, Field entry, Length = 5 | N | Format = 99999 |
| Lifecycle start date | Lifecycle | M | The field that identifies when the relationship between the two objects began | Used to check the relationship of the activity to information | A2I | Date, Field entry, Length = 10 | Y | Julian Calendar; Format = YYYY/MM/DD |
| Lifecycle end date | | M | The field that identifies when the relationship between the two objects end | Used to check the relationship of the activity to information | A2I | Date, Field entry, Length = 10 | Y | Julian Calendar; Format = YYYY/MM/DD |

Activity to Information Object: why the Information is Transformed by the Activity The participant to enabler object describes why information referenced in the object is transformed by the activity referenced in the object. Essentially, this cross-object relationship table provides a connection between an event and information about the event. Any type of data may be included in the activity to information object. For example, the object may specify the subject activity and information objects, category information relating to the activity (e.g., active, passive, other), a type of the activity (e.g., processing, validation), as well as the other information noted below.

Table 14 shows an exemplary definition of an activity to information object. Other embodiments may employ a different type of table with different fields.

TABLE 14

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes the object with detail | Used to provide a secondary means of identify and searching | | Character, Field entry, Length = 255 | N | |
| Category | Classification | | The field that identifies the relationship to the physical activity | Used to validate the information that transformed by an activity automated by an enabler | E2I; E2A | Character, Selection, Length = 15 | Y | Interactive, Active, Passive, etc. |

TABLE 14-continued

| Field Name | Field Type | Req | Description | Use | Object Check | Type | Ref. | Reference Table Values |
|---|---|---|---|---|---|---|---|---|
| Type | | M | The field that identifies the activity that transforms the information object | Used to validate the information that transformed by an activity automated by an enabler | E2I; E2A | Character, Selection, Length = 12 | Y | Activity Processing, Validation, Trading, Evaluation, Reference, etc. |
| Before processing | State | M | The field that identifies the initial state of the information object prior to its transformation via the activity | Used to check the information relevancy and the participant's requirement for controlling the event process | E2I; P2A; I2I | Numeric, Field entry, Length = 3 | N | Format = 999 e.g. 000, 001, 002, 003 000 means that this info does not yet exist and the enabler supports a creation process. |
| After Processing | | M | The field that identifies the initial state of the information object after its transformation via the activity | Used to check the information relevancy and the participant's requirement for controlling the event process | A2I; P2I; I2I | Numeric, Field entry, Length = 3 | N | Format = 999 e.g. "state before processing" + 1, so: 001, 002, 003, 004 ... n + 1 |
| Activity Object ID | Relationship | M | The field that contains the activity object identification key | Used to link the two objects and describe that relationship | ACTID (foreign key) | Numeric, Selection, Length = 7 | Y | ID value from the Activity Table |
| Activity Object Name | | M | The field that contains the activity object name value | Used to link the two objects and describe that relationship | ACTNAM (foreign key) | Character, Default, Length = 30 | Y | Name value from Activity Table auto-selected based on ACTID |
| Information Object ID | | M | The field that contains the information object identification key | Used to link the two objects and describe that relationship | INFID (foreign key) | Numeric, Selection, Length = 7 | Y | ID value from the Information Table |
| Information Object Name | Relationship | M | The field that contains the information object name value | Used to link the two objects and describe that relationship | INFNAM (foreign key) | Character, Default, Length = 30 | Y | Name value from Information Table auto-selected based on INFID |
| Frequency | Performance | O | This field documents the number of times the activity is performed when transforming the information object | Used to check the performance of the enabler required to transform the information object | E2I; I2I | Numeric, Field entry, Length = 5 | N | Format = 99999 |
| Duration | | O | This field documents the duration of the activity when transforming the information object | Used to check the performance of the enabler required to transform the information object | E2I; I2I | Numeric, Field entry, Length = 5 | N | Format = 99999 |
| Timescale | | O | This field documents the timescale of the duration field | Used to check the performance of the enabler required to transform the information object | E2I; I2I | Character, Selection, Length = 8 | Y | Years, months, weeks, days, hours, minutes, seconds, etc |

TABLE 14-continued

| Field Name | Field Type | Req | Description | Use | Object Check | Type | Ref. | Reference Table Values |
|---|---|---|---|---|---|---|---|---|
| Volume | | O | This field documents the volume of information that is transformed by the activity | Used to check the performance of the enabler required to transform the information object | E2I; I2I | Numeric, Field entry, Length = 5 | N | Format = 99999 |
| Lifecycle start date | Lifecycle | M | The field that identifies when the relationship between the two objects began | Used to check the relationship of the activity to information | E2I | Date, Field entry, Length = 10 | Y | Julian Calendar; Format = YYYY/MM/DD |
| Lifecycle end date | | M | The field that identifies when the relationship between the two objects end | Used to check the relationship of the activity to information | E2I | Date, Field entry, Length = 10 | Y | Julian Calendar; Format = YYYY/MM/DD |

Value Objects

Value objects define, e.g., objectives, benefits, metrics, influences, settings, and domains within the EAAF database. The value objects may be used to complement the information in a cell or process scenario. For example, these objects may be used to specify how different process scenarios generate value to the enterprise. Furthermore, value objects may be used to define environmental settings in which process scenarios are constructed and influences that impact such process scenarios.

Enterprise Objectives

The enterprise objectives object links enterprise strategies, goals and objectives in a single record, and may be used to align an initiative to a specific enterprise objective. Any type of data may be included in the enterprise objectives object.

Table 15 shows an exemplary definition of an enterprise objectives object. Other embodiments may employ a different type of table with different fields.

TABLE 15

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes the object with detail | Used to provide a secondary means of identify and searching | | Character, Field entry, Length = 255 | N | |
| Category | Classification | M | The field indicates the category of the objective | Used to classify the objective | | Character, Selection, Length = 15 | Y | Predefined reference table values |
| Type | | M | The field indicates the type of the objective | Used to classify the objective | | Character, Selection, Length = 15 | Y | Predefined reference table values |
| Criticality | | M | The field that describes the criticality of the objective | Used to classify the objective | | Character, Selection, Length = 25 | Y | Business critical, Program critical, Project critical, Operation critical, Decision critical, Non-critical, etc. |

TABLE 15-continued

| Field Name | Field Type | Req | Description | Use | Object Check | Type | Ref. | Reference Table Values |
|---|---|---|---|---|---|---|---|---|
| Lifecycle start date | Lifecycle | M | The field that identifies when the objective was formulated | Used to provide a window of opportunity for the objective | | Date, Field entry, Length = 10 | Y | Julian Calendar; Format = YYYY/MM/DD |
| Lifecycle end date | | M | The field that identifies when the objective is slated to terminate | Used to provide a window of opportunity for the objective | | Date, Field entry, Length = 10 | Y | Julian Calendar; Format = YYYY/MM/DD |

Enterprise Benefits

The enterprise benefits object links enterprise performance groups with expected benefits. Any type of data may be included in the enterprise benefits object.

Table 16 shows an exemplary definition of an enterprise benefits object. Other embodiments may employ a different type of table with different fields.

TABLE 16

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes the object with detail | Used to provide a secondary means of identify and searching | | Character, Field entry, Length = 255 | N | |
| Category | Classification | M | The field indicates the category of the benefit | Used to classify the benefit | | Character, Selection, Length = 15 | Y | Predefined reference table values |
| Type | | M | The field indicates the type of the benefit | Used to classify the benefit | | Character, Selection, Length = 15 | Y | Predefined reference table values |
| Criticality | | M | The field that describes the criticality of the benefit | Used to classify the benefit | | Character, Selection, Length = 25 | Y | Business critical, Program critical, Project critical, Operation critical, Decision critical, Non-critical, etc. |
| Lifecycle start date | Lifecycle | M | The field that identifies when the benefits would begin | Used to provide a window of opportunity for the benefit | | Date, Field entry, Length = 10 | Y | Julian Calendar; Format = YYYY/MM/DD |
| Lifecycle end date | | M | The field that identifies when the benefits would end | Used to provide a window of opportunity for the benefit | | Date, Field entry, Length = 10 | Y | Julian Calendar; Format = YYYY/MM/DD |

Performance Metrics

The performance metrics object specifies performance metrics that are representative of a specific industry, trade, and/or governmental performance benchmark. The performance metrics include performance standards that are used for comparison of results from executed process scenarios with results generated from value formulas. The value formulas (defined below) are used for measuring performance results to compare against the industry, trade and/or governmental performance benchmarks, and influence actions to take to move toward the performance benchmarks.

Table 17 shows an exemplary definition of a performance metrics object. Other embodiments may employ a different type of table with different fields.

TABLE 17

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes the object with detail | Used to provide a secondary means of identify and searching | | Character, Field entry, Length = 255 | N | |
| Category | Classification | M | The field indicates the category of the performance metric | Used to classify the performance metric | | Character, Selection, Length = 15 | Y | Predefined reference table values |
| Type | | M | The field indicates the type of the performance metric | Used to classify the performance metric | | Character, Selection, Length = 15 | Y | Predefined reference table values |
| Criticality | | M | The field that describes the criticality of the performance metric | Used to classify the performance metric | | Character, Selection, Length = 25 | Y | Business critical, Program critical, Project critical, Operation critical, Decision critical, Non-critical, etc. |
| Lifecycle start date | Lifecycle | M | The field that identifies when the performance metrics would begin | Used to provide a window of opportunity for the performance metric | | Date, Field entry, Length = 10 | Y | Julian Calendar; Format = YYYY/MM/DD |
| Lifecycle end date | | M | The field that identifies when the performance metrics would end | Used to provide a window of opportunity for the performance metric | | Date, Field entry, Length = 10 | Y | Julian Calendar; Format = YYYY/MM/DD |

Environmental Settings

The environmental settings object identifies internal and external settings that exist and that drive process scenarios. Environmental factors, when related together in a unique combination, define the setting or condition in which the enterprise operates, and which the enterprise overcomes to build a system of elements that deliver value to customers and that return value to investors.

Table 18 shows an exemplary definition of an environmental settings object. Other embodiments may employ a different type of table with different fields.

TABLE 18

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |

TABLE 18-continued

| Field Name | Field Type | Req | Description | Use | Object Check Type | Ref. | Reference Table Values |
|---|---|---|---|---|---|---|---|
| Description | | M | An intelligent, non-standard value that describes the object with detail | Used to provide a secondary means of identify and searching | Character, Field entry, Length = 255 | N | |
| Category | Classification | M | The field indicates the category of the environmental setting | Used to classify the environmental setting | Character, Selection, Length = 25 | Y | Legal, Societal, Physical, Cultural, Economic, Terrestrial Commerce, etc. |
| Type | | M | The field indicates the type of the environmental setting | Used to classify the environmental setting | Character, Selection, Length = 35 | Y | Regulations, Education, Laws, Religion, Weather, Terrain, Economy, Language, etc. |
| Criticality | | M | The field that describes the criticality of the environmental setting | Used to classify the environmental setting | Character, Selection, Length = 25 | Y | Business critical, Program critical, Project critical, Operation critical, Decision critical, Non-critical, etc. |
| Lifecycle start date | Lifecycle | M | The field that identifies when the environmental settings would begin | Used to provide a window of opportunity for the environmental setting | Date, Field entry, Length = 10 | Y | Julian Calendar; Format = YYYY/MM/DD |
| Lifecycle end date | | M | The field that identifies when the environmental settings would end | Used to provide a window of opportunity for the environmental setting | Date, Field entry, Length = 10 | Y | Julian Calendar; Format = YYYY/MM/DD |

Influences

This object specifies sources and types of influences that impact the enterprise. Identifying and defining influences that drive different enterprise dimensions is helpful to understanding why and how such dimensions differ. This enables the enterprise to properly compare results from different process scenarios and to determine the arrangement of cells in a process scenario that provides the greatest value to the enterprise.

Table 19 shows an exemplary definition of an influences object. Other embodiments may employ a different type of table with different fields.

TABLE 19

| Field Name | Field Type | Req | Description | Use | Object Check Type | Ref. | Reference Table Values |
|---|---|---|---|---|---|---|---|
| ID | General | M | A non-intelligent value that defines the unique "key" for the database record | Used to uniquely identify the object as a record and for relating it with other objects | Auto number | N | |
| Name | | M | A non-intelligent standard value that describes the object | Used to provide the primary means of identifying and searching | Character, Field entry, Length = 30 | N | |
| Description | | M | An intelligent, non-standard value that describes the object with detail | Used to provide a secondary means of identify and searching | Character, Field entry, Length = 255 | N | |

TABLE 19-continued

| Field Name | Field Type | Req | Description | Use | Object Check | Type | Ref. | Reference Table Values |
|---|---|---|---|---|---|---|---|---|
| Source | Classification | M | The field indicates the source of the influence | Used to classify the influence | | Character, Selection, Length = 25 | Y | Political, Legal, Social, Economic, Regulatory, Environmental, Technology, etc. |
| Type | | M | The field indicates the type of the influence | Used to classify the influence | | Character, Selection, Length = 35 | Y | Direct, Indirect, Cumulative, etc. |
| Impact | | M | The field that describes the impact of the influence | Used to classify the influence | | Character, Selection, Length = 25 | Y | Image, Business, Financial, Trade, Conduct, Decision Operation, etc. |
| Lifecycle start date | Lifecycle | M | The field that identifies when the influences would begin | Used to provide a window of opportunity for the influence | | Date, Field entry, Length = 10 | Y | Julian Calendar; Format = YYYY/MM/DD |
| Lifecycle end date | | M | The field that identifies when the influences would end | Used to provide a window of opportunity for the influence | | Date, Field entry, Length = 10 | Y | Julian Calendar; Format = YYYY/MM/DD |

Domains: the Layers of the EAAF Database

Linked cells in a single decision-control domain comprise a single layer of the EAAF database. Each such layer encompasses the domain of authority a participant controls and the span of information a participant uses to make a decision or act upon information. The EAAF database is designed to capture common and cross object relationships at different levels of decision-control for the participant.

Figure 8:
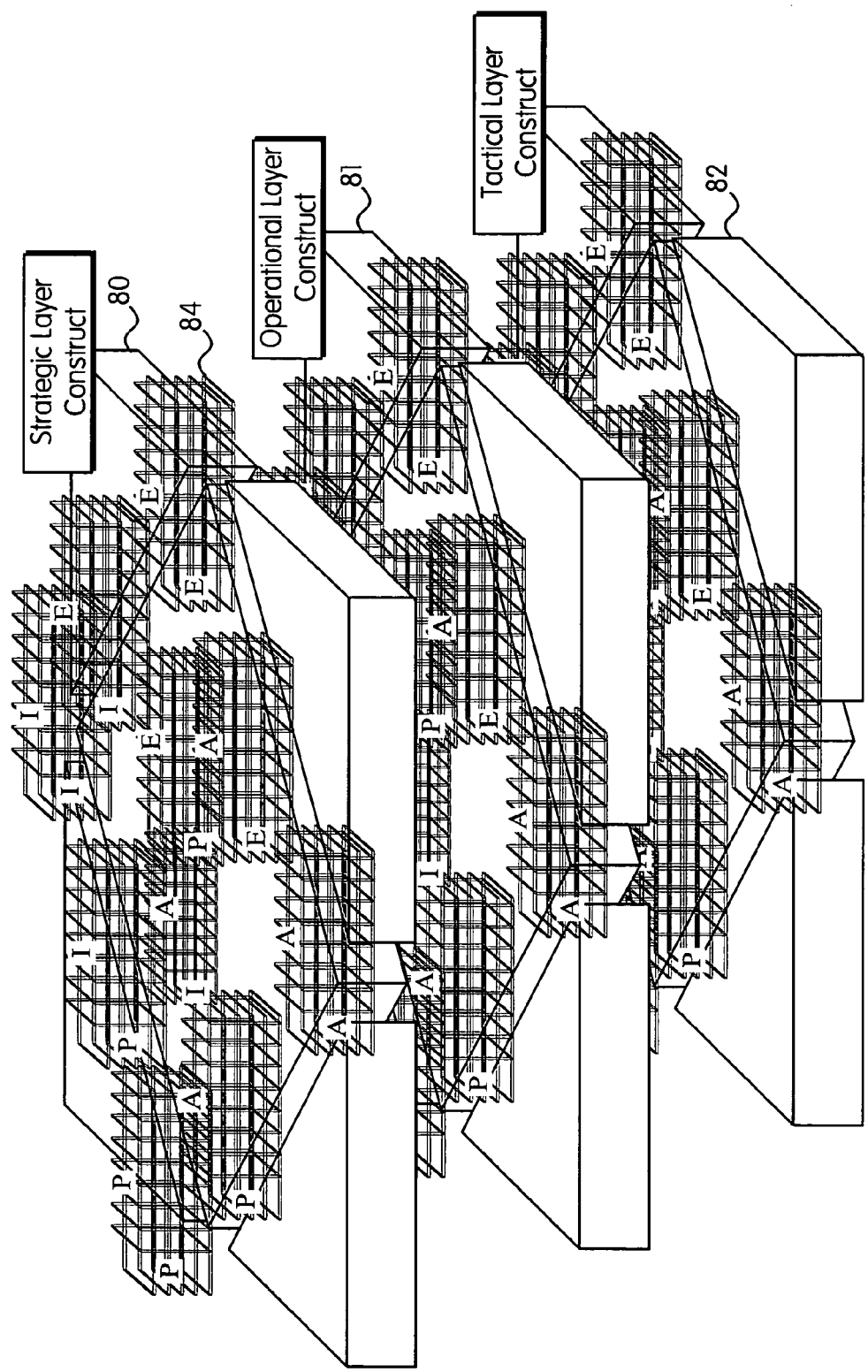
FIG. 8 depicts stacking of different decision control domains.

Each construct layer of the EAA Framework represents a decision-control domain, defined by the intersection of the decision, control, and authority for a class or type of participant and, the span of information access for that class or type of participant. These domains are "stacked" together to complete the EAA Framework, as shown, e.g., in FIG. 8. In FIG. 8, the decision control domains 80, 81 and 82 are stacked, with various objects (e.g., 84) depicted. The stacking provides an integrated view and decomposition of enterprise's participants, their information, and processes for dynamic modeling.

Table 20 shows an exemplary definition of a domain object. Other embodiments may employ a different type of table with different fields.

TABLE 20

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes the object with detail | Used to provide a secondary means of identify and searching | | Character, Field entry, Length = 255 | N | |
| Standard | Classification | M | The field indicates whether the domain is associated with a standards organization | Used to classify the influence | | Character, Selection, Length = 25 | Y | Industry, Scientific, Trade, Business, Public, Customer, Government, etc. |
| Lifecycle start date | Lifecycle | M | The field that identifies when the influences would begin | Used to provide a window of opportunity for the influence | | Date, Field entry, Length = 10 | Y | Julian Calendar; Format = YYYY/MM/DD |

TABLE 20-continued

| Field Name | Field Type | Req | Description | Use | Object Check | Type | Ref. | Reference Table Values |
|---|---|---|---|---|---|---|---|---|
| Lifecycle end date | | M | The field that identifies when the influences would end | Used to provide a window of opportunity for the influence | | Date, Field entry, Length = 10 | Y | Julian Calendar; Format = YYYY/MM/DD |

Value Element Object

The value element defines the value of information that is transformed during a process scenario. In this regard, to identify value in process scenario, a measurement point in the process scenario is selected. This point reflects where a decision takes place to engage a subsequent process scenario and/or to alter the existing process scenario. The information about activities taking place from a prior decision point is provided to the decision maker and reflects benefits and risks of changes to process scenario sequencing.

As described above, to make a decision, information that constitutes a cost-benefit justification of changes to the process scenario is calculated. The information is used to determine levels of information system automation and modularity that are required to increase information value and to decrease the cost of the activities or to drive more responsiveness to changing environmental conditions and/or influences that impact the enterprise and their processes.

Table 21 shows an exemplary definition of a value element object. Other embodiments may employ a different type of table with different fields.

TABLE 21

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes with detail | Used to provide a secondary means of identify and searching | | Character, Field entry, Length = 255 | N | |
| Category | Classification | M | The field that identifies the key attribute drive the enterprise value | Used to identify the generation of value or how value will be boosted | | Character, Selection, Length = 15 | Y | Relevancy, Velocity, Completeness, Accuracy |
| Type | | M | The field that determines the nature of the value that will be result as of the improvement | Used to identify how the value is used to improve the worth of the enterprise | | Character, Selection, Length = 15 | | Financial, Performance, Quality, Image, Goodwill, Standing, etc. |
| Enterprise Objective Object ID | Relationship | M | The field that contains the information object identification key | Used to link the two objects and describe that relationship | OBJID (foreign key) | Numeric, Selection, Length = 7 | Y | ID value from the Enterprise Objectives Table |
| Enterprise Objective Object Name | | M | The field that contains the information object name value | Used to link the two objects and describe that relationship | OBJNAM (foreign key) | Character, Default, Length = 30 | Y | Name value from Enterprise Objectives Table auto-selected based on OBJID |
| Enterprise Benefit Object ID | | M | The field that contains the information object identification key | Used to link the two objects and describe that relationship | BENID (foreign key) | Numeric, Selection, Length = 7 | Y | ID value from the Enterprise Benefits Table |

TABLE 21-continued

| Field Name | Field Type | Req | Description | Use | Object Check | Type | Ref. | Reference Table Values |
|---|---|---|---|---|---|---|---|---|
| Enterprise Benefit Object Name | | M | The field that contains the information object name value | Used to link the two objects and describe that relationship | BENNAM (foreign key) | Character, Default, Length = 30 | Y | Name value from Enterprise Benefits Table auto-selected based on BENID |
| Performance Metric Object ID | | M | The field that contains the information object identification key | Used to link the two objects and describe that relationship | PERID (foreign key) | Numeric, Selection, Length = 7 | Y | ID value from the Performance Metrics Table |
| Performance Metric Object Name | | M | The field that contains the information object name value | Used to link the two objects and describe that relationship | PERNAM (foreign key) | Character, Default, Length = 30 | Y | Name value from Performance Metrics Table auto-selected based on PERID |
| Lifecycle start date | Lifecycle | M | The field that identifies when the value element would begin | Used to provide a window of opportunity for the element | | Date, Field entry, Length = 10 | Y | Julian Calendar; Format = YYYY/MM/DD |
| Lifecycle end date | | M | The field that identifies when the value element would end | Used to provide a window of opportunity for the value element | | Date, Field entry, Length = 10 | Y | Julian Calendar; Format = YYYY/MM/DD |

Processes

These above-described objects may be used to define a business process, and to define how different business processes generate value for an enterprise based, e.g., on their domain assignment, contribution to business objectives, benefits produced for the enterprise, and the like. The objects also define business processes by specifying environmental settings in which a process operates, and influences that impact the process.

The EAAF stores objects that define individual processes or larger processes (referred to as "scenarios") within an enterprise. These objects are built using the core objects and relationships objects defined above. They also exist in conjunction with the value objects, which define conditions in which those processes operate.

Cell

Objects may be mapped within an enterprise decision control domain using common and cross-object relationships and information regarding those relationships. A single set of core objects related by cross-object relationship objects constitutes a cell. Generally speaking, a cell includes a set of elements needed to complete an objective, and to derive information related to the objective, so that a decision can be made by a participant or so that information can be transformed to a state that is usable by another cell.

Figure 5:
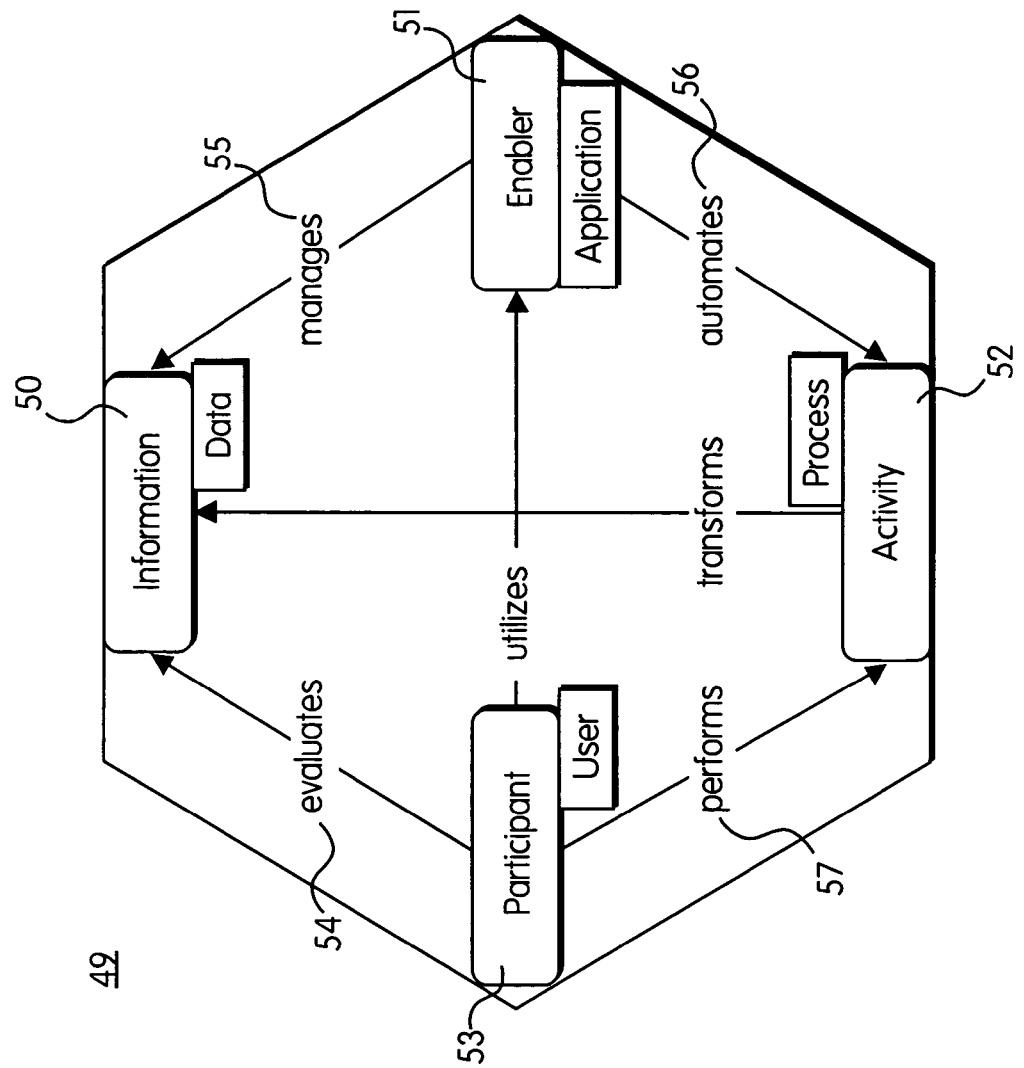
FIG. 5 is a diagram that depicts a cell conceptually.

FIG. 5 shows a cell conceptually. As shown in FIG. 5, cell 49 is defined by core objects 50 to 52 and relationships 54 to 57 between those core objects. The relationships are defined by cross-object relationship objects, which are described above.

In this embodiment, cells are objects, which are defined by tables. An example of an object description table for a cell is shown below in Table 21. Other embodiments may employ a different type of table with different fields.

In Table 22, the basic relationships between the four core elements defined in the object, namely the participant object, the information object, the activity object and the enabler object, are defined by applying cross-object relationships to those core objects. In this example, the cross-object relationships, which are also defined in the cell object, include the participant to information object, the activity to information object, and the enabler to activity object. It is noted that cells may be time-dependent, meaning that they may be valid only for specified periods of time.

TABLE 22

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |

TABLE 22-continued

| Field Name | Field Type | Req | Description | Use | Object Check | Type | Ref. | Reference Table Values |
|---|---|---|---|---|---|---|---|---|
| Description | | M | An intelligent, non-standard value that describes the object with detail | Used to provide a secondary means of identify and searching | | Character, Field entry, Length = 255 | N | |
| Type | Classification | M | The field indicates whether the domain is associated with a standards organization | Used to classify the cell | | Character, Selection, Length = 25 | Y | Operation, Event, Trigger, etc |
| Participant to Enabler ID | Relationship | M | A non-intelligent value that defines the unique "key" for the database record | Used to uniquely identify the object as a record and for relating it with other objects | | Number, Selection, Length = 7 | Y | ID value from Participant to Enabler Cross - Object Relationship Table |
| Participant to Enabler Name | | M | A non-intelligent standard value that describes the object | Used to provide the primary means of identifying and searching | | Character, Default, Length = 30 | N | Name value from Information Table Auto-selected based on A2IID |
| Activity to Information ID | | M | A non-intelligent value that defines the unique "key" for the database record | Used to uniquely identify the object as a record and for relating it with other objects | | Number, Selection, Length = 7 | Y | ID value from Activity to Information Cross-Object Relationship Table |
| Activity to Information Name | | M | A non-intelligent standard value that describes the object | Used to provide the primary means of identifying and searching | | Character, Default, Length = 30 | N | Name value from Information Table Auto-selected based on A2IID |
| Enabler to Activity ID | | M | A non-intelligent value that defines the unique "key" for the database record | Used to uniquely identify the object as a record and for relating it with other objects | | Number, Selection, Length = 7 | Y | ID value from Enabler to Activity Cross-Object Relationship Table |
| Enabler to Activity Name | | M | A non-intelligent standard value that describes the object | Used to provide the primary means of identifying and searching | | Character, Default, Length = 30 | N | Name value from Information Table Auto-selected based on E2AID |
| Currency | Valuation | O | The field that defines the currency for the valuation | | | Character, Selection, Length = 3 | Y | EUR, USD, SKR, DKR, SFR, GBP, SPA, etc |
| Amount | Valuation | O | The field that defines the cost of the cell's activity | | | Currency, Calculation, Length = 15 | N | Resource = (i)(f) C + (t)(f)L + (v)(d) M = (o)(r)E; a cell type "event" or "trigger" has a cost = 0 |
| Lifecycle start date | Lifecycle | M | The field that identifies when the relationships begin | Used to determine the time-period validity of the cell | | Date, Field entry, Length = 10 | Y | Julian Calendar; Format = YYYY/ MM/DD |
| Lifecycle end date | | M | The field that identifies when the relationships end | Used to determine the time-period validity of the cell | | Date, Field entry, Length = 10 | Y | Julian Calendar; Format = YYYY/ MM/DD |

Decision Point Object

As noted above, to identify a process scenario's value within a given enterprise dimension and decision-control domain, a decision point is identified to determine where the valuation of the process scenario will occur. This point is where a decision, within the domain of a participants' authority, would take place to engage a subsequent process scenario and/or alter the existing process scenario. The decision point constitutes a point where an effective cost-benefit analysis can be executed for comparative analysis.

The above-noted cost-benefit analysis may be used to determine the level of information system automation and modularity that are required to facilitate increasing information value and decreasing cost of the activities or to drive more responsiveness to changing environmental conditions that are reflection of the degrees of freedom within an enterprise dimension. Thus, if more adaptation is required because of unpredictability from impacts to a process scenario caused by changing environmental conditions and influences, the need for flexibility and adaptation becomes greater. However, flexibility and adaptability should be weighed against the overall benefit derived from that particular process scenario, i.e., the output and benefit derived by the enterprise.

Table 23 shows an exemplary definition of an object that defines a decision point (e.g., a cell) within a process scenario for valuation purposes. Other embodiments may employ a different type of table with different fields.

TABLE 23

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes with detail | Used to provide a secondary means of identify and searching | | Character, Field entry, Length = 255 | N | |
| Category | Classification | M | The field that identifies the nature of the decision with respect to its occurrence | Used to identify the timing of the decision and if it | | Character, Selection, Length = 15 | Y | Recurring, one-time, cyclical, unique, etc. |
| Type | | M | The field that identifies the basis or criteria that drives the decision point within the process | Used to identify how the information will be interpreted | | Character, Selection, Length = 25 | | Time-based, performance-based, financial-based, quality-based, etc. |
| Information Object ID | Relationship | M | The field that contains the information object identification key | Used to link the two objects and describe that relationship | INFID (foreign key) | Numeric, Selection, Length = 7 | Y | ID value from the Information Table |
| Information Object Name | | M | The field that contains the information object name value | Used to link the two objects and describe that relationship | INFNAM (foreign key) | Character, Default, Length = 30 | Y | Name value from Information Table auto-selected based on INFID |
| Value Element Object ID | | M | The field that contains the value element object identification key | Used to link the two objects and describe that relationship | VALID (foreign key) | Numeric, Selection, Length = 7 | Y | ID value from the Value Element Table |
| Value Element Object Name | | M | The field that contains the value element object name value | Used to link the two objects and describe that relationship | VALNAM (foreign key) | Character, Default, Length = 30 | Y | Name value from Value Element Table auto-selected based on VALID |
| Lifecycle start date | Lifecycle | M | The field that identifies when the decision point would begin | Used to provide a window of opportunity for the decision point | | Date, Field entry, Length = 10 | Y | Julian Calendar; Format = YYYY/MM/DD |
| Lifecycle end date | | M | The field that identifies when the decision point would end | Used to provide a window of opportunity for the decision point | | Date, Field entry, Length = 10 | Y | Julian Calendar; Format = YYYY/MM/DD |

Process Scenario

Cells may be linked together in a flow that reflects how information is transformed over time from one state to another state. This time-dependent flow is defined by each cell's information transformation requirements and how its influences impact existing environmental settings. A process scenario is a process that may be represented by linking multiple cells (or other types of "building blocks").

Figure 6:
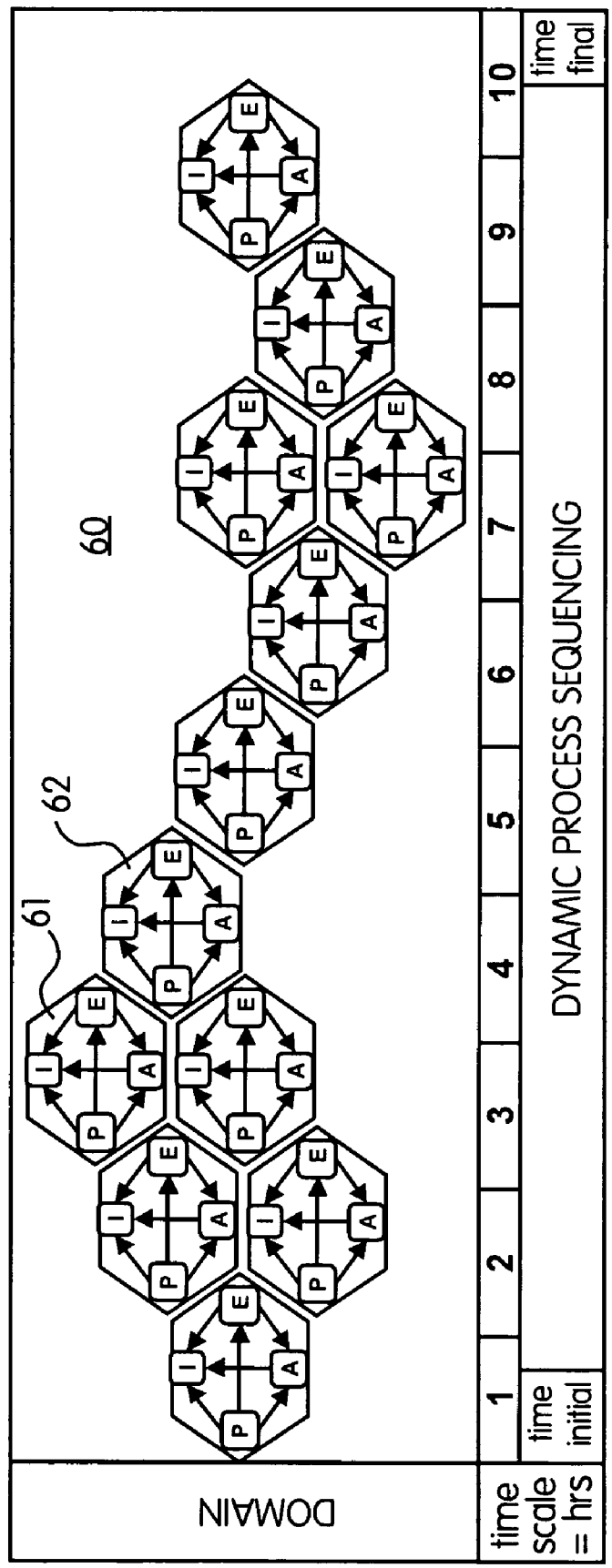
FIG. 6 is a diagram that depicts a process scenario conceptually.

FIG. 6 shows a conceptual view of a process scenario 60. As shown in FIG. 6, process scenario is made up of various cells 61, 62, etc. that are connected in a temporal string to define a process from start to finish.

Process scenarios are objects that are defined by object description tables. These tables define relationships that cells have to one another in the process scenario. Information objects in the cells of a process scenario link the various cells to form the process scenario. This configuration reflects the fact that a process (e.g., a cell) may be dependent on information from another process (e.g., a preceding cell). A common information object thus may link the two cells in a process scenario. Accordingly, a chain of cells, all of which are linked by their information objects, may form a process scenario. In other embodiments, objects other than the information object may link the cells.

Table 24 defines elements that are used to build process scenarios. Other embodiments may employ a different type of table with different fields.

TABLE 24

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes with detail | Used to provide a secondary means of identify and searching | | Character, Field entry, Length = 255 | N | |
| Domain ID | Classification | M | A non-intelligent value that defines the unique "key" for the database record | Used to uniquely identify the object as a record and for relating it with other objects | | Number, Selection, Length = 7 | Y | ID value from Decision-Control Domain Table |
| Domain Name | | M | A non-intelligent standard value that describes the object | Used to provide the primary means of identifying and searching | | Character, Default, Length = 30 | N | Name value from Decision-Control Domain Table Auto-selected based on DOMID |
| Lifecycle start date | Lifecycle | M | The field that identifies when the scenario would begin | Used to provide a window of opportunity for the scenario | | Date, Field entry, Length = 10 | Y | Julian Calendar; Format = YYYY/MM/DD |
| Lifecycle end date | | M | The field that identifies when the scenario would end | Used to provide a window of opportunity for the scenario | | Date, Field entry, Length = 10 | Y | Julian Calendar; Format = YYYY/MM/DD |

Variations in influences and environmental settings that impact an enterprise dimension will impact each decision-control domain differently. This difference in the impacts creates the potential for conflicting optimization between decision-control domains. This is reflected through the structuring of process scenarios that optimize a single decision-control domain, but which, when linked with the other decision-control domains, can sub-optimize the entire enterprise.

Table 25 shows a table that defines a process scenario object. Other embodiments may employ a different type of table with different fields.

TABLE 25

| Field Name | Field Type | Req | Description | Use | Object Check | Type | Ref. | Reference Table Values |
|---|---|---|---|---|---|---|---|---|
| ID | General | M | A non-intelligent value that defines the unique "key" for the database record | Used to uniquely identify the object as a record and for relating it with other objects | | Auto number | N | |
| Name | | M | A non-intelligent standard value that describes the object | Used to provide the primary means of identifying and searching | | Character, Field entry, Length = 30 | N | |
| Description | | M | An intelligent, non-standard value that describes with detail | Used to provide a secondary means of identify and searching | | Character, Field entry, Length = 255 | N | |
| Scenario Object ID | Relationship | M | The field that contains the cell object identification key | Used to link the two objects and describe that relationship | SCNID (foreign key) | Numeric, Selection, Length = 7 | Y | ID value from the Scenario Table |
| Scenario Object Name | | M | The field that contains the cell object name value | Used to link the two objects and describe that relationship | SCNNAM (foreign key) | Character, Default, Length = 30 | Y | Name value from Scenario Table auto-selected based on SCNID |
| Cell Object ID | | M | The field that contains the cell object identification key | Used to link the two objects and describe that relationship | CELID (foreign key) | Numeric, Selection, Length = 7 | Y | ID value from the Cell Table |
| Cell Object Name | | M | The field that contains the cell object name value | Used to link the two objects and describe that relationship | CELNAM (foreign key) | Character, Default, Length = 30 | Y | Name value from Cell Table auto-selected based on CELID |
| Influence Object ID | | O | The field that contains the influence object identification key | Used to link the two objects and describe that relationship | IFLID (foreign key) | Numeric, Selection, Length = 7 | Y | ID value from the Influence Table |
| Influence Object Name | | O | The field that contains the influence object name value | Used to link the two objects and describe that relationship | IFLNAM (foreign key) | Character, Default, Length = 30 | Y | Name value from Influences Table auto-selected based on IFLID |
| Environmental Setting Object ID | | M | The field that contains the environmental setting object identification key | Used to link the two objects and describe that relationship | ENVID (foreign key) | Numeric, Selection, Length = 7 | Y | ID value from the Environmental Settings Table |
| Environmental Setting Object Name | Relationship | M | The field that contains the environmental setting object name value | Used to link the two objects and describe that relationship | ENVNAM (foreign key) | Character, Default, Length = 30 | Y | Name value from Environmental Settings Table auto-selected based on ENVID |
| Decision Point Object ID | | O | The field that contains the decision point object identification key | Used to link the two objects and describe that relationship | DPTID (foreign key) | Numeric, Selection, Length = 7 | Y | ID value from the Decision Point Table |

TABLE 25-continued

| Field Name | Field Type | Req | Description | Use | Object Check | Type | Ref. | Reference Table Values |
|---|---|---|---|---|---|---|---|---|
| Decision Point Object Name | | O | The field that contains the decision point name value | Used to link the two objects and describe that relationship | DPTNAM (foreign key) | Character, Default, Length = 30 | Y | Name value from Decision Table auto-selected based on DPTID |
| Relative Time Increment | Event Sequence | M | The field that identifies the time increment for the event sequence | Used to determine the increment of the relative time sequence | | Numeric, Selection, Length = 10 | Y | 1, 10, 100, 1000, 10000, etc |
| Relative Time Scale | | M | The field that identifies the time scale for the event sequence | Used to determine the scale at which the relative time sequence applies | | Character, Selection, Length = 20 | Y | Milli-seconds, seconds, minutes, hours, days, weeks, months, years, etc. |
| Relative Initial Time | | M | The field that identifies the process scenario object's relative initial time | Used to determine sequence of the process scenario object in the event model | | Numeric, Field Entry, Length = 5 | N | Format = 99999 |
| Relative Final Time | | M | The field that identifies the process scenario object's relative final time | Used to determine sequence of the process scenario object in the event model | | Numeric, Field Entry, Length = 5 | N | Format = 99999 |
| Information Velocity | Valuation Metrics | O | The field identifies the speed of the information object ID identified within the cell through a process scenario | Used to determine the impact of the enabler to enabler integration with respect to the call protocol | E2EPRO | Numeric, Formula, Length = 20 [PSCRFT–PSCRIT] | N | <velocity {info object}> (time|final| – |initial|)/ time |standard| |
| Information Completeness | | O | The field identifies the ratio of completeness of the information object as managed by the enabler | Used to determined the participant's use of the enabler with respect to the criticality | P2ICRI | Numeric, Formula, Length = 20 [manually entered values] | N | <completeness {info object}> (# of data elements |entered| – |blank|)/ # of data elements |total| |
| Information Accuracy | | O | The field identifies the ratio of the differences between the physical and information characteristics with respect to the final number of physical object characteristic | Used to check the information state before and after processing in relationship to the state of the material or physical object | A2IINI; A2IFIN | Numeric, Formula, Length = 20 [manually entered values] | N | <accuracy {info object}>(# physical object attributes|state x| – # of info object attributes |state x|)/# of physical object attributes|final state| |
| Information Relevancy | | O | The field identifies the ratio of the information to physical object characteristics at any point in time | Used to check at any point in time the latency of the information processing | E2IINI; E2IFIN | Numeric, Formula, Length = 20 [manually entered values] | N | <relevancy{info object}>(information object attributes|state x|)/physical object attributes |state x| |
| Activity Cost of Capital | | | The field identifies the cash used/employed for the activity and the associated cost of capital | Used to determine the benefit | | Numeric, Formula, Length = 20 [manually entered values] | N | <capital cost {activity object}> (cash position|initial| – |final|) × periodic rate |standard| |

TABLE 25-continued

| Field Name | Field Type | Req | Description | Use | Object Check | Type | Ref. | Reference Table Values |
|---|---|---|---|---|---|---|---|---|
| Activity Cost of Labor | Valuation Metrics | O | The field identifies the cost labor associated with the activity | Used to validate the level of manual effort to perform an activity and the associated labor costs | P2A | Numeric, Formula, Length = 20 [manually entered values] | N | <labor cost {activity object}> (process time \|final\| − \|initial\|) × unit labor cost \|periodic rate\| × productivity level |
| Activity Cost of Materials | | O | The field identifies the cost of materials consumed for this activity | Used to validate the usage of materials including any scrap for an activity | | Numeric, Formula, Length = 20 [manually entered values] | N | <material cost {activity object}> (# of material components \|final\| − \|initial\|) × unit material cost\|standard rate\|/scrap rate |
| Activity Cost of Equipment | | O | The field identifies the cost of equipment utilized at a standard rate qualified by the operating rate of the equipment | Used to validate the utilization and cost of equipment rationalized by the operating rate of the equipment | | Numeric, Formula, Length = 20 [manually entered values] | N | <equipment cost {activity object}> (equipment usage\|time final\| − \|time initial\|) × equipment cost \|standard rate\| × operating rate) |

Valuating Information

The EAAF database makes it possible to valuate information that is transformed during a process scenario. To identify value in process scenario, a point (e.g., a cell) in the process scenario is selected. This point reflects where a decision would take place to engage a subsequent process scenario and/or to alter the existing process scenario. This decision point thus constitutes a point where a cost-benefit analysis can be determined. Such an analysis may be used to determine levels of information system automation and modularity that are required to increase information value and to decrease the cost of the activities or to drive more responsiveness to changing environmental conditions. For example, if more adaptation is required because of unpredictability from impacts to the process caused by changing environmental conditions and influences, the need for flexibility and adaptation becomes greater. However, flexibility and adaptability is weighed against the overall benefit derived from that particular process i.e., the output and benefit derived by the enterprise.

Since not all domains treat information consistently in terms of the impact or value of the decision made or activity undertaken, information has different valuations. The total value generated from a process scenario is directly proportional to the scope of impact either from a decision made by a participant or an activity executed, i.e., the value of impact, and is inversely proportional to the cost of the activities that are generating or transforming the information i.e., the value of activity. This can be expressed as a formula:

$$Vt = Vi/Va,$$

where $Vt$ is the total value, $Vi$ is the value of impact, and $Va$ is the value of activity. These values are set forth in Table 25 above. The values of $Vi$ and $Va$ may be determined from elements of the various objects and other related information. In one embodiment, the value of $Vi$ is determined using the following parameters, where the parenthetical indicates the object in the cell (at the decision point) from which the components used to derive the parameters are determined. For example, for the "velocity" parameter, the components, e.g., "time|final|" are obtained from the information ("info") object. The probability factor, which does not contain a parenthetical, is input by an administrator based on knowledge of the process scenario.

velocity{info object}=(time|final|−time|initial|)/ time|standard|)

completeness{info object}=(data elements|entered|− data element|blank|/data elements|total|)

relevancy{info object}=(information object attributes|state $x$|/physical object attributes|state $x$)| accuracy{info object}=(# physical object attributes|state $x$|−# of info object attributes|state $x$|)/# of physical object attributes|final state|)

cash flow{info object}=(cash generated|revenue or cost attributed to information object|]

probability factor=achieving the correct and timely decision from information object obtained by a user The value for Vi is determined as follows:

$Vi$=(velocity+completeness+relevancy)×(accuracy)× (cash flow)×(probability factor)

In one embodiment, the value of Va is determined using the following parameters capital cost{process object}=(cash position|final|− cash position|initial|)×interest rate|standard rate|×differential|rate| labor cost{process object}=(process time|final|−process time|initial|)×unit labor cost|standard rate|× productivity level material cost{process object}=(# of material
   components|final|−# of material
   components|initial|)×unit material
   cost|standard|×percent scrap equipment cost{process object}=(equipment
   usage|time $f$|−equipment usage|time $i$|)×unit
   equipment cost|standard rate|×operating rate probability factor=accuracy of the data values for the
   process object The value for Va is determined as follows:

Va=(capital cost+labor cost+material cost+equipment
   cost)×(probability factor)

Once Vi and Va are determined, Vt can be determined. It is then possible to alter conditions in the process scenario to affect the value of Vt, i.e., to increase or decrease Vt. This increase or decrease corresponds to the effect on the value generated by the process scenario at the decision point.

Enterprise Scenario

Different decision control domains (i.e., layers) may be "stacked" in a single EAAF database. The different layers may be integrated to model an enterprise. In one embodiment, these layers include a strategic layer, an operational layer, and a tactical layer.

In general, the strategic layer contains cells that drive and measure a business, including products, customers, resources, etc. The strategic layer deals with questions relating to how a company does business to make money and what business elements contribute to the creation of value for the enterprise and for their customers (as viewed by shareholders, stakeholders and customers alike).

Objects in this layer may include, but are not limited to the following. Information objects include business objects that directly touch physical objects, i.e., products, customers, suppliers, labor as well as their support objects, contracts, designs, and the like. Participant objects define information owners who are responsible for timely decisions and outcomes. Enabler objects include types of applications and tools on which data equivalents of the information objects reside, such as business intelligence tools and data warehousing applications. Activity objects relate to enterprise and product value-chain activity elements constructed and sequenced for enterprise level optimization of deliverables and performance results.

The operational layer contains cells that define information states and object clusters related to activity sequences (e.g., input/output). The operation layer deals with questions relating to how the company delivers products and operates as an enterprise.

Objects in this layer may include, but are not limited to the following. Information objects include business object components, i.e., materials, credit rating, payment term, work schedules, etc., and related support objects, agreements, drawings, etc. Participant objects include process scenario owners responsible for operational performance. Enabler objects include applications where processes reside that transform data objects when triggered by events and constraints based on data object sharing. Activity objects include business operations and support activity elements constructed and sequenced for operational level optimization of deliverables and performance results.

The tactical layer contains cells, comprised of core objects, that define information states and object clusters related to activity sequences (e.g., input/output). The operation layer deals with questions relating to how the company transacts, i.e., different task-flows that enable the company to operate efficiently in different environments through automation of its technical and business transactions.

Objects in this layer may include, but are not limited to the following. Information objects include objects identifying attributes, states, predictability, and reliability at each execution stage of an activity with contextual references for comparability. Participant objects define participants responsible for transaction input, output, usage, support and performance. Enabler objects define tool and application interoperability and role-based access to ensure that specific process scenarios can be executed and performance targets specified. Activity objects define procedures and activity elements constructed and sequenced for tactical level optimization of deliverables and performance results.

Figure 7:
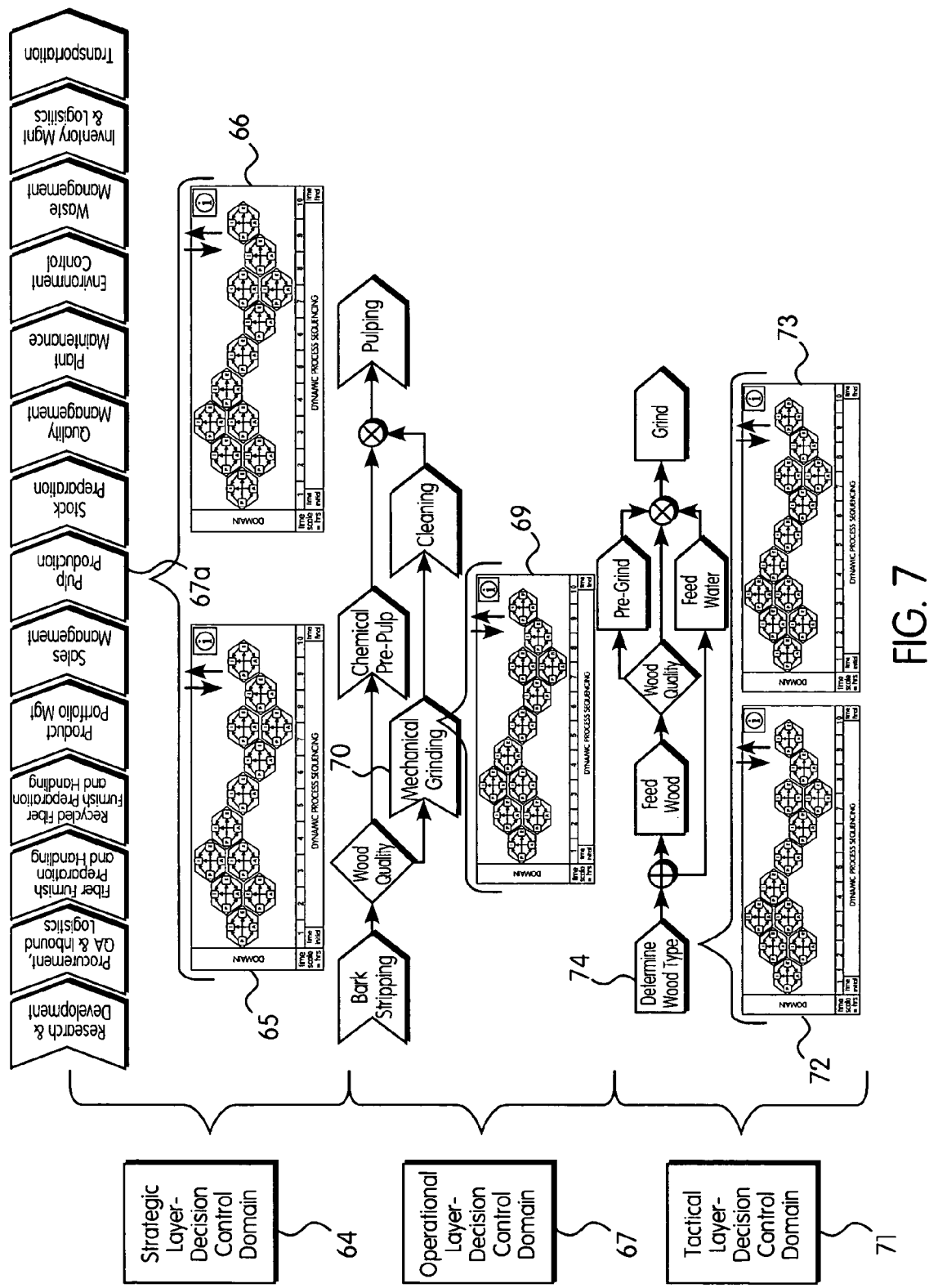
FIG. 7 is a diagram that shows process scenarios for different decision control domains of an enterprise.

FIG. 7 shows an example of process scenarios for different layers of an enterprise. More specifically, as shown in FIG. 7, strategic layer 64 includes two process scenarios 65 and 66 for its "pulp production" element 67a. In operational layer 67, "pulp production" element 67a includes process scenario 69 to implement a "mechanical grinding" step 70. In tactical layer 71, two process scenarios 72 and 73 are implemented in the step 74 for determining a wood type to use for pulp production.

EXAMPLE

The following example illustrates the how to use the EAAF database in an analysis. This example begins by defining process scenario objects that utilize relationships of a decision point, influences and environmental settings to the process scenario, and cells that facilitate dynamic re-sequencing of event chains. i.e., process scenario objects This example relates to a fictional company that has a manufacturing operations in China and in the southeastern United States, and compares operational performance and process adaptability. To analyze the company, the following are determined, which have an impact on how effectively an event sequence, i.e., the process scenario, can be adapted to a new conditions: environmental settings, influences, and a decision point.

In this example, the company has two plants—one located in the southeastern United States and the other located one in the Shandong Province near the city Weihai, China. Both plants produce the same goods. The U.S. plant produces the goods for the American and European markets and the Chinese plant produces the goods for the Middle-East and Asian markets. Given the need for the consistency in quality due to the global nature of their customers, identical production processes are deployed in both plants. The equipment and factory floor layout is identical to optimize asset investments and reduce unique training and maintenance expenses. Both plants use the same global raw material vendor to ensure consistent quality control. The employees attend similar training classes and their job roles are substantially identical in nature.

In this example, the company receives a large order, which exceeds its normal operating capacity given set-up and maintenance time required during a production run. The company needs to evaluate their flexibility to determine how they can optimally produce goods for the order without wholesale outsourcing, which reduces the overall profitability of the order. Given that most of environmental settings that would impact the production are consistent, e.g., knowledge and skill (productivity), material quality (scrap rates), machine capacity (production capacity), it would appear that there are no differences is the degrees of freedom, i.e., the variability of the sequence of events within the process scenario, that would provide information to the company's decision makers regarding optimization of the company's production facilities.

Factors that may have been initially overlooked, or that may not be typically included in enterprise architectural system modeling tools, include the relationship of environmental factors relating to culture and to political influence to the process scenario (i.e., the event sequence that occurs in the plant to satisfy the order). This is due to the fact that these factors may not impact or relate at the tactical layer of the decision control domain. Nor would these factors impact information requirements for supporting the production process, maintenance processes, and quality processes that are needed to manage optimization of the company's manufacturing process. The tactical layer considers various factors that would impact the manufacturing processes, such as those noted above. Thus, an enterprise architecture system that evaluates the information requirements to support that level would only consider those factors At the operational decision-control domain, the cultural and political factors do have an impact on information and, in turn, decisions made from that information. The linkage of these factors to the process scenario provides an opportunity to re-sequence the process scenario to optimize events. To do so requires several linkages between objects, and not a simple relationship of environmental and influence factors to a process scenario. First, since impact and evaluation occurs on a higher domain level, and the decision point is linked to information, an information to information relationship is used to establish a structure of the information necessary to make the decision. Latency of the information object that is reported or used for a decision is considered, since making the decision requires that the information state be known, so as to determine its relevancy to an actual state of the physical world. For example, production work-in-process must be known and the identities of information systems reporting the work-in-process must be known, along with whether the work-in-process is batch or real-time. This information is used to determine the -in-process latency in a report. This will provide decision makers with the current excess capacity that may be available at the time of the decision.

The decision-point in the process scenario object is determined beforehand, making it possible to correctly determine a place in the event sequence where the information is reported, and whether the remainder of the event or subsequent events can (or cannot) be re-sequenced. Without this knowledge, it may be possible to execute one or more process changes, but the process may be too advanced to permit a wholesale change of the events. In this regard, the fact that there is a cellular structure to the event sequence does not imply that cells that comprise a process scenario can be dynamically re-sequenced at any point. The decision-points are the control points at which changes can be introduced into the event sequence so as not to sub-optimize the lower or higher domain levels.

Finally, the valuation metrics are associated with the process scenario object at the decision point within the event sequence. This is the case in order to drive the cost benefit associated with reconfiguration of the event (process scenario) sequence. The valuation of the information includes the accuracy, completeness, relevancy and velocity of the information and the value of the activity includes the cost of capital, labor, resources and materials necessary for the event chain that is comprised of the process scenario objects between the decision-control points in an event chain. Thus, this contiguous set of cells produces a value metric that is measurable and useful in evaluating opportunities, such as options for increasing production capacity as is in this example.

With the defined relationships mentioned above, and the relationship of environmental and influence factors to the process scenario object, the operational level management can evaluate the options available to them and the impact of any decision. Thus, in this example, the social influence on the US manufacturing operations was positive in the sense that the company wants to expand their production facility in their area to promote higher paying manufacturing jobs. Thus, the company could impose weekend overtime without a lose of employee productivity and morale.

The environmental setting in Chinese province discourage companies from imposing work rules that impede quality of family life, combined with regulation influence that would require additional production reporting for the addition work time. This has a negative impact on re-sequencing the event chain to allow for higher production output through double shifts or changes in the production rates. These induced changes would cause worker productivity to decrease and increase overall production costs.

Generating Reports

As described herein, the EAAF database acts as a "storage area" for elements of an enterprise architecture. By querying the EAAF database, it is possible to generate reports relating to an enterprise. For example, two categories of reports may be generated: one that give an overview of an existing information system (IS)/information technology (IT) landscape, and one that identifies gaps in, and impacts of, a new IT solution.

Examples of reports that may be generated include (a) A list of values (name, descriptions, etc.) linked to a scenario for a layer number. The reports list a date of a window of opportunity relating to realization of a value and an expected amount. (b) A list of all basic cells of a scenario. The report lists participants (record id, name), activities (record id, name), information (record id, name) and enablers (record id, name). (c) For a given scenario, a list of all participants of cells in the scenario or in scenarios in the given scenario. (d) For a given scenario, a list of all information for cells in the scenario or in scenarios in the given scenario. (e) For a given scenario, a list of all enablers of cells in the scenario or in scenarios in the given scenario. (f) For a given scenario, a list of all activities of cells in the scenario or in scenarios in the given scenario. (g) A list of all tables sorted by any fields of the table. Other reports also may be generated. Likewise, the EAAF may be queried for any information that it contains.

Hardware and Software

The EAAF database may be built on, and used in conjunction with, any hardware and software. The EAAF database may find applicability in any computing or processing environment and with any type of machine that is capable of running machine-readable instructions, such as a computer program. The EAAF database may be implemented in hardware, software, or a combination of the two. The EAAF database may be used in conjunction with computer programs executing on programmable computers that each include a processor, a storage medium readable by the processor (including volatile and non-volatile memory and/or storage elements), at least one input device, and one or more output devices. Program code may be applied to data entered using an input device (e.g., a mouse or keyboard) to build and/or access the EAAF database.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to build and/or access the EAAF database. The EAAF database may also be implemented on one or more computer-readable storage media, configured with or without a computer program.

The EAAF database is not limited to the embodiments set forth herein. Other embodiments are also within the scope of the following claims.

What is claimed is:

1. A method of modeling an enterprise, comprising:
performing the following actions on a processing device:
defining core objects, the core objects comprising information objects defining information used in the enterprise, participant objects defining participants in the enterprise, enabler objects defining tools used in the enterprise, and activity objects defining processes performed in the enterprise;
defining relationship objects that define interactions between two or more of the core objects;
defining cells comprising at least an information object, other core objects, and relationship objects, each cell being an object for linking sets of core and relationship objects needed to complete a specific objective and/or derive information;
defining a process scenario object in which two or more cells are linked, the process scenario object defining how information is transformed over time among cells;
defining a domain that relates the process scenario object to one or more other domains hierarchically via one or more other process scenario objects; and
generating a report that is based on the modeling of the enterprise;
wherein the process scenario object comprises references to value objects that have an affect on a corresponding process scenario, the value objects defining: environmental conditions that drive the process scenario, external influences on the process scenario, and objectives of the enterprise;
wherein the process scenario object comprises a reference to a decision point object, the decision point object specifying a point, in the process scenario, where a change can be made without adversely affecting the one or more other domains, the decision point object specifying a value analysis to be performed at the point specified in the decision point object, the value analysis for determining whether to alter the process scenario or to engage a subsequent process scenario, information corresponding to the value analysis being associated with the process scenario object;
wherein the process scenario object defines a chain of cells, each cell in the chain of cells being linked to at least one of an immediately preceding cell or an immediately succeeding cell via an information object that is common to the cell and the immediately preceding cell or the immediately succeeding cell; and
wherein the value analysis comprises a cost/benefit analysis relating to whether to alter the process scenario or to engage a subsequent process scenario, the cost/benefit analysis for weighing a benefit of the process scenario against a benefit related to an alteration of the process scenario or engagement of a subsequent process scenario.

2. The method of claim 1, wherein each domain comprises a decision-making layer within the enterprise.

3. The method of claim 1, wherein an information object is common to the process scenario object and a second process scenario object.

4. The method of claim 1, further comprising:
performing the following action on a processing device:
storing, in a value element object linked to the process scenario object, a value of information transformed via the process scenario, the value of the information corresponding to a result of the cost/benefit analysis.

5. The method of claim 1, wherein the relationship objects define one of common object relationships and cross-object relationships.

6. The method of claim 1, wherein the value objects further comprise at least one object to define a benefit of the enterprise, and at least one object to define a performance metric associated with the enterprise.

7. The method of claim 6, wherein the performance metric comprises at least one of an industry metric and a government metric.

8. One or more machine-readable media for storing instructions for modeling an enterprise, the instructions being executable to:
define core objects, the core objects comprising information objects defining information used in the enterprise, participant objects defining participants in the enterprise, enabler objects defining tools used in the enterprise, and activity objects defining processes performed in the enterprise;
define relationship objects that define interactions between two or more of the core objects;
define cells comprising at least an information object, other core objects, and relationship objects, each cell being an object for linking sets of core and relationship objects needed to complete a specific objective and/or derive information;
define a process scenario object in which two or more cells are linked, the process scenario object defining how information is transformed over time among cells;
define a domain that relates the process scenario object to one or more other domains hierarchically via one or more other process scenario objects; and
generate a report that is based on the modeling of the enterprise;
wherein the process scenario object comprises references to value objects that have an affect on a corresponding process scenario, the value objects defining: environmental conditions that drive the process scenario, external influences on the process scenario, and objectives of the enterprise;
wherein the process scenario object comprises a reference to a decision point object, the decision point object specifying a point, in the process scenario, where a change can be made without adversely affecting the one or more other domains, the decision point object specifying a value analysis to be performed at the point specified in the decision point object, the value analysis for determining whether to alter the process scenario or to engage a subsequent process scenario, information corresponding to the value analysis being associated with the process scenario object;

wherein the process scenario object defines a chain of cells, each cell in the chain of cells being linked to at least one of an immediately preceding cell or an immediately succeeding cell via an information object that is common to the cell and the immediately preceding cell or the immediately succeeding cell; and wherein the value analysis comprises a cost/benefit analysis relating to whether to alter the process scenario or to engage a subsequent process scenario, the cost/benefit analysis for weighing a benefit of the process scenario against a benefit related to an alteration of the process scenario or engagement of a subsequent process scenario.

9. The one or more machine-readable media of claim 8, wherein each domain comprises a decision-making layer within the enterprise.

10. The one or more machine-readable media of claim 8, wherein an information object is common to the process scenario object and a second process scenario object.

11. The one or more machine-readable media of claim 8, further comprising instructions to:
   store, in a value element object linked to the process scenario object, a value of information transformed via the process scenario, the value of the information corresponding to a result of the cost/benefit analysis.

12. The one or more machine-readable media of claim 8, wherein the relationship objects define one of common object relationships and cross-object relationships.

13. The one or more machine-readable media of claim 8, wherein the value objects further comprise at least one object to define a benefit of the enterprise, and at least one object to define a performance metric associated with the enterprise.

14. The one or more machine-readable media of claim 13, wherein the performance metric comprises at least one of an industry metric and a government metric.

* * * * *